US009705161B2

(12) United States Patent
Nishihara et al.

(10) Patent No.: US 9,705,161 B2
(45) Date of Patent: Jul. 11, 2017

(54) BATTERY MODULE, BATTERY SYSTEM, ELECTRIC VEHICLE, MOBILE UNIT, ELECTRIC POWER STORAGE DEVICE, POWER SUPPLY DEVICE, AND ELECTRIC DEVICE

(75) Inventors: Yoshitomo Nishihara, Osaka (JP); Yasuhiro Asai, Hyogo (JP); Tsuyoshi Watanabe, Gifu (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 791 days.

(21) Appl. No.: 14/008,213

(22) PCT Filed: Sep. 15, 2011

(86) PCT No.: PCT/JP2011/005217
§ 371 (c)(1),
(2), (4) Date: Sep. 27, 2013

(87) PCT Pub. No.: WO2012/131809
PCT Pub. Date: Oct. 4, 2012

(65) Prior Publication Data
US 2014/0017533 A1    Jan. 16, 2014

(30) Foreign Application Priority Data

Mar. 29, 2011  (JP) .................................. 2011-072904

(51) Int. Cl.
*H01M 2/06*    (2006.01)
*H01M 10/48*   (2006.01)
(Continued)

(52) U.S. Cl.
CPC ........... *H01M 10/482* (2013.01); *B60L 11/18* (2013.01); *H01M 2/06* (2013.01); *H01M 2/202* (2013.01);
(Continued)

(58) Field of Classification Search
CPC ........ H01M 2/06; H01M 2/202; H01M 2/204; H01M 2/206; H01M 10/4207; H01M 10/425; H01M 10/482; B60L 11/18
See application file for complete search history.

(56) References Cited

U.S. PATENT DOCUMENTS

2006/0290355 A1* 12/2006 Lee .................... G01R 31/3624
                                                    324/429
2009/0305117 A1* 12/2009 Koh .................... H01M 2/0404
                                                    429/61
(Continued)

FOREIGN PATENT DOCUMENTS

JP    2003-45409    2/2003
JP    2008-226744   9/2008
(Continued)

OTHER PUBLICATIONS

International Search Report issued Dec. 27, 2011 in International Application No. PCT/JP2011/005217.

*Primary Examiner* — Mark F Huff
*Assistant Examiner* — Monique Wills
(74) *Attorney, Agent, or Firm* — Wenderoth, Lind & Ponack, L.L.P.

(57) ABSTRACT

A battery module includes a battery block, a cover member, a circuit board, a wiring member, and a first connection member. The battery block includes a plurality of battery cells, and has a terminal surface. Terminals of the plurality of battery cells are arranged on the terminal surface. The cover member is arranged on or above the terminal surface of the battery block. The circuit board overlaps the cover member, and includes a voltage detection circuit for detecting terminal voltages of the plurality of battery cells. The wiring member overlaps the cover member, and is electrically connected to the terminals of the plurality of battery (Continued)

cells. The first connection member electrically connects the circuit board to the wiring member.

9 Claims, 20 Drawing Sheets

(51) Int. Cl.
*H01M 2/20* (2006.01)
*H01M 10/42* (2006.01)
*B60L 11/18* (2006.01)
*H02J 7/00* (2006.01)

(52) U.S. Cl.
CPC ..... *H01M 10/425* (2013.01); *H01M 10/4207* (2013.01); *H02J 7/007* (2013.01); *H01M 2/204* (2013.01); *H01M 2/206* (2013.01)

(56) References Cited

U.S. PATENT DOCUMENTS

| 2011/0024205 | A1 | 2/2011 | Nishihara et al. |
| 2011/0212348 | A1* | 9/2011 | Yasui ................. H01M 2/1077 429/7 |

FOREIGN PATENT DOCUMENTS

| JP | 2010-55882 | 3/2010 |
| JP | 2010-97722 | 4/2010 |
| JP | 2010-160930 | 7/2010 |
| JP | 2010-205509 | 9/2010 |
| JP | 2011-49158 | 3/2011 |

* cited by examiner

BATTERY MODULE, BATTERY SYSTEM, ELECTRIC VEHICLE, MOBILE UNIT, ELECTRIC POWER STORAGE DEVICE, POWER SUPPLY DEVICE, AND ELECTRIC DEVICE

BACKGROUND OF THE INVENTION

1. Field of the Invention

The present invention relates to a battery module, a battery system, an electric vehicle, a mobile unit, an electric power storage device, a power supply device, and an electric device.

2. Description of the Related Art

Battery modules including a plurality of rechargeable battery cells are used for mobile units (e.g., electric cars) or power supply devices that store electric power. In order to detect charged conditions of the battery cells, it is necessary to detect terminal voltages of the battery cells in the battery modules.

For example, Japanese Patent Laid-Open Publication No. JP 2010-205,509 A discloses a battery system that includes a battery block constructed of a plurality of rectangular battery cells. An insulating plate is arranged on or above the battery block. Bus bars and lead wire lines are constructed integrally with the insulating plate. The plurality of battery cells are connected through the bus bars to each other. Terminal voltages of the battery cells are detected through the lead wire lines. The electrode terminals of the battery cell adjacent to each other are connected through the bus bars to each other. The lead wire lines are connected to the bus bars inside the insulating plate, and are drawn out from the insulating plate and connected to a voltage detection circuit.

Also, Japanese Patent Laid-Open Publication No. JP 2003-45,409 A discloses a power supply device that includes a battery assembly including a plurality of batteries, an insulating plate (referred to as measurement main unit), and a flat circuit unit. The flat circuit unit may include a control unit that adjusts voltages of the plurality of batteries to a common certain voltage. Terminals of the battery are arranged on the upper surface of the battery assembly. The insulating plate and the flat circuit are placed onto and cover the upper surface of the battery assembly. The terminals of the battery extend through terminal through holes in the insulating plate, and are connected to a conductive layer of the flat circuit unit.

SUMMARY OF THE INVENTION

In the case where an insulating plate is arranged on a battery block that is constructed of a plurality of battery cells, when a circuit board including a voltage detection circuit is arranged on the insulating plate, in order to simplify the construction of the battery module, it is necessary to use a wiring member for easy and reliable connection the terminals of the battery cells to the circuit board.

It is an object of the present invention to provide a simply constructed battery module, and an electric vehicle, a mobile unit, an electric power storage device, a power supply device and an electric device that include the simply constructed battery module.

A battery module according to an aspect of the present invention includes a battery block, a cover member, a circuit board, a wiring member, and a first connection member. The battery block includes a plurality of battery cells, and has a terminal surface. Terminals of the plurality of battery cells are arranged on the terminal surface. The cover member is arranged on or above the terminal surface of the battery block. The circuit board overlaps the cover member, and includes a voltage detection circuit for detecting terminal voltages of the plurality of battery cells. The wiring member overlaps the cover member, and is electrically connected to the terminals of the plurality of battery cells. The first connection member electrically connects the circuit board to the wiring member.

According to the present invention, the construction of a battery module can be simplified, and the battery module can be easily assembled.

The above and further objects of the present invention as well as the features thereof will become more apparent from the following detailed description to be made in conjunction with the accompanying drawings.

DETAILED DESCRIPTION OF THE EMBODIMENT(S)

The following description will describe a battery module, a battery system, an electric vehicle, a mobile unit, an electric power storage device, a power supply device, and an electric device according to embodiments of the present invention with reference to the drawings.

(1) First Embodiment

A battery module according to a first embodiment of the present invention is now described.

(1-1) Entire Construction

Figure 1:
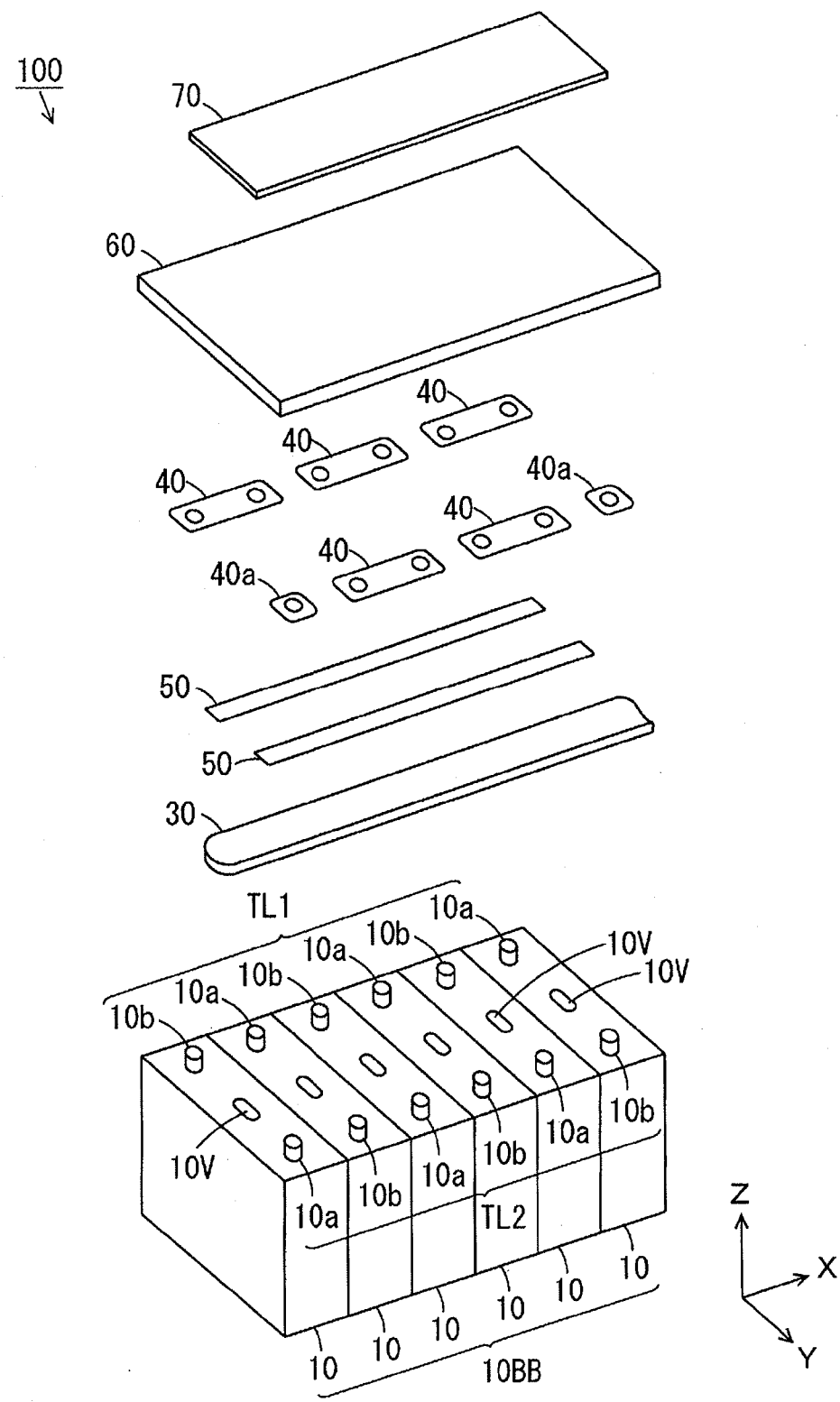
FIG. 1 is an exploded perspective view showing the construction of a battery module according to a first embodiment.

FIG. 1 is an exploded perspective view showing the construction of a battery module according to a first embodiment of the present invention. Three directions that intersect to each other at right angles are defined as X, Y and Z directions as shown by arrows of X, Y, and Z in FIG. 1, and FIGS. 2 to 7 and 9 to 15 as discussed below. In this embodiment, the X and Y directions extend in the horizontal plane, while the Z direction extends in the direction that intersects to the horizontal plane other at a right angle. In addition, the upward direction is indicated by the arrow Z.

As shown in FIG. 1, the battery module 100 includes a battery block 10BB, a gas duct 30, a pair of elongated flexible printed circuit boards (hereinafter, referred to as FPC boards) 50, a plurality of bus bars 40 and 40a, a cover member 60, and a rigid printed circuit board (hereinafter, referred to as circuit board) 70. The FPC boards 50 are an example of wiring member. The bus bars 40 and 40a are examples of second connection member.

The battery block 10BB consists of a plurality of (six in this embodiment) battery cells 10 having a low-profile substantially rectangular parallelepiped shape. The plurality of battery cells 10 are aligned in the X direction. For example, the battery cells 10 are rechargeable batteries such as lithium ion batteries or nickel metal hydride batteries. The battery block 10BB has a substantially rectangular parallelepiped shape. The upper surface of the battery block is in parallel to the X-Y plane. One and another end surfaces of the battery block are in parallel to the Y-Z plane. One and another side surfaces of the battery block are in parallel to the X-Z plane.

A gas relief valve 10v is formed at the center of the upper surface of each of the battery cells 10. If an internal pressure of the battery cell 10 reaches a predetermined value, a gas inside the battery cell 10 can be discharged through the gas relief valve 10v. Positive and negative terminals 10a and 10b are aligned on the upper surface of each of the battery cells 10 in the Y direction, and are positioned symmetrically with respect to the gas relief valve 10v. The positive and negative terminals 10a and 10b protrude upward from the upper surface of each of the battery cells 10. The upper surface of battery block 10BB corresponds to a terminal surface.

The plurality of battery cells 10 are arranged with two battery cells adjacent to each other being flipped from side to side so that the positive and negative terminals 10a and 10b of the two battery cells 10 adjacent to each other are flipped from side to side in the Y-directional relationship. According to this construction, the negative and positive terminals 10b and 10a are alternately aligned in the X direction along one side surface of the battery block 10BB. Also, the positive and negative terminals 10a and 10b are alternately aligned in the X direction along another side surface of the battery block 10BB. Hereinafter, the positive and negative terminals 10a and 10b that are aligned along the one side surface of the battery block 10BB are referred to as first terminal row TL1, while the positive and negative terminals 10a and 10b that are aligned along the another side surface of the battery block 10BB are referred to as second terminal row TL2.

The gas duct 30, the pair of FPC boards 50, the plurality of bus bars 40 and 40a, the cover member 60, and the circuit board 70 are arranged on or above the upper surface of the battery block 10BB.

The gas duct 30 extends in the X direction of, and is arranged between the first and second terminal rows TL1 and TL2 so that the gas duct 30 overlaps the gas relief valves 10v of the plurality of battery cells 10. The pair of FPC boards 50 extend in the X direction. The pair of FPC boards, and the plurality of bus bars 40 and 40a are mounted to the lower surface of the cover member 60 having a rectangular plate shape. The circuit board 70 is mounted to the upper surface of the cover member 60. The cover member 60 is formed of an electrically insulating material such as resin. The FPC boards 50 are connected to the circuit board 70 through connection members PH (FIG. 7) as discussed below. The pair of FPC boards 50, the plurality of bus bars 40 and 40a, the cover member 60, and the circuit board 70 are mounted integrally with each other to the upper surface of the battery block 10BB.

(1-2) Cover Member, Bus Bar and FPC Board

Figure 2:
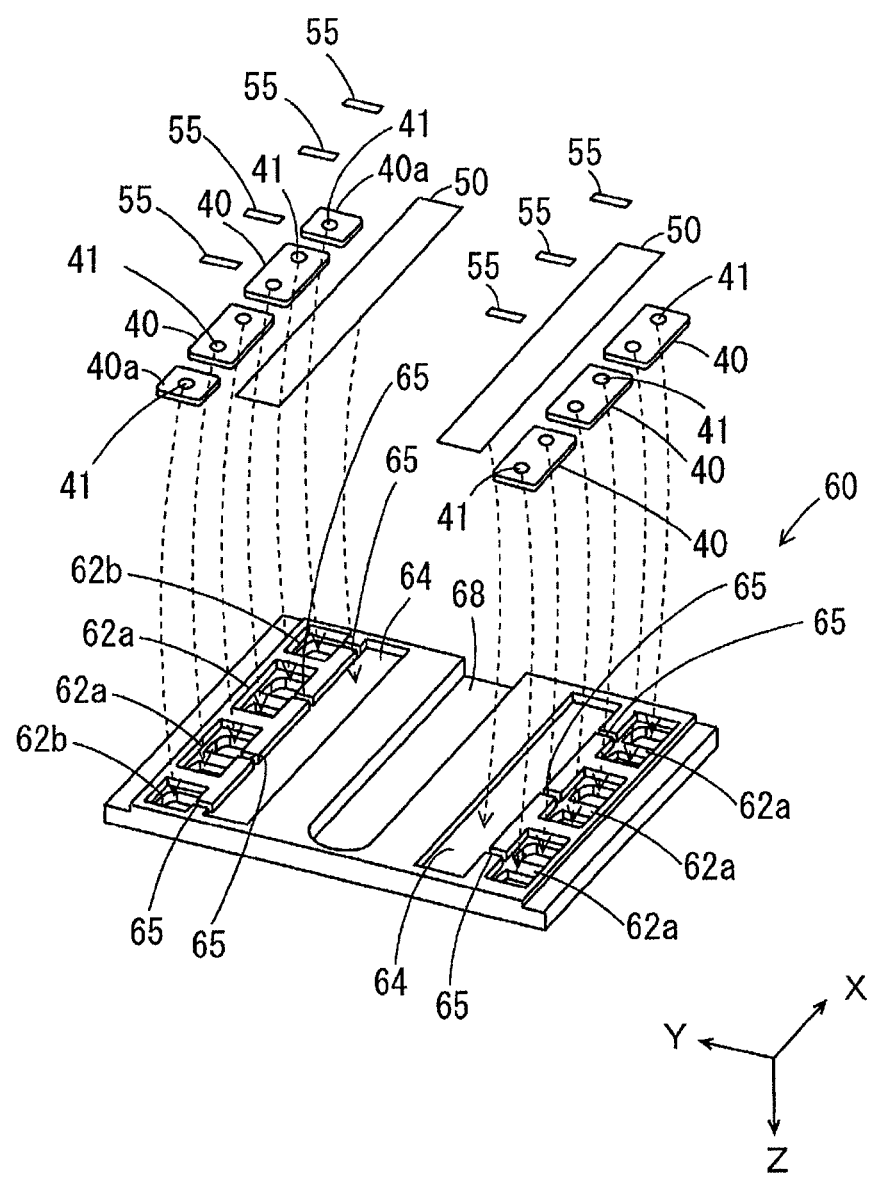
FIG. 2 is a perspective view showing a cover member as viewed from the bottom side.
Figure 3:
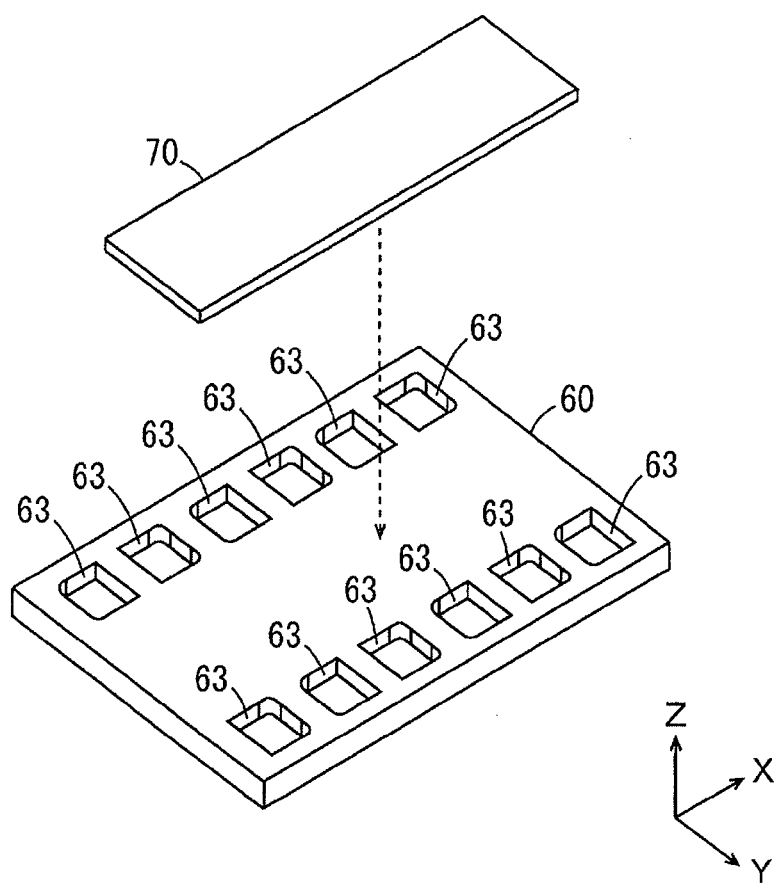
FIG. 3 is a perspective view showing the cover member as viewed from the top side.

The bus bars 40 and 40a, the cover member 60, and the FPC board 50 are now described in detail. FIG. 2 is a perspective view showing the cover member 60 as viewed from the bottom side. FIG. 3 is a perspective view showing the cover member 60 as viewed from the top side. Hereinafter, one side edge of the cover member 60 that extends in the X direction is referred to as one side edge, while another side is referred to as another side edge. The one side edge of the cover member 60 extends along the one side surface of the battery block 10BB, while the another side edge of the cover member 60 extends along the another side surface of the battery block 10BB. Also, one surface of the cover member 60 that faces the battery block 10BB is referred to as back surface, while another surface of the cover member 60 on the side opposite to back surface is referred to as front surface. In this embodiment, the back surface of the cover member 60 is an example of first surface of the cover member, while the front surface of the cover member 60 is an example of second surface of the cover member. In this embodiment, the front surface of the cover member 60 faces upward.

As shown in FIG. 2, the bus bars 40 and 40a have a substantially rectangular shape. The X-directional length of the bus bar 40 is longer than the bus bar 40a. A pair of terminal connection openings 41 are formed in the bus bar 40, while one terminal connection opening 41 is formed in the bus bar 40a. The bus bars 40 and 40a are formed of tough pitch copper. The surfaces of bus bars are plated with nickel.

Recessed portions 62a and 62b are aligned along the one and another side edges of the cover member 60 on the back surface of the cover member 60. In this embodiment, three recessed portions 62a are aligned along the one side edge of the cover member 60, while two recessed portions 62a and two recessed portions 62b are aligned along the another side edge of the cover member 60. The two recessed portions 62b are arranged on the outsides of the two recessed portions 62a.

The recessed portions 62a and 62b have a substantially rectangular shape. The X-directional length of the recessed portion 62a is longer than the recessed portion 62b. The shape and length of the recessed portion 62a are substantially equal to the shape and length of the bus bar 40, while the shape and length of the recessed portion 62b are substantially equal to the shape and length of the bus bar 40a. Openings 63 are formed extending from the bottom surfaces of the recessed portions 62a and 62 to the surface of the cover member 60 (FIG. 3). Two openings 63 (FIG. 3) are formed in each of the recessed portion 62a, while one opening 63 (FIG. 3) is formed in each of the recessed portions 62b. Hereinafter, the recessed portions 62a and the openings 63 that are aligned along the one side edge of the cover member 60 are referred to as one-side-edge recessed portions 62a and one-side-edge openings 63, respectively, while the recessed portions 62a and the openings 63 that are aligned along the another side edge of the cover member 60 are referred to as another-side-edge recessed portions 62a and another-side-edge openings 63, respectively.

The bus bars 40 can be fitted into the recessed portions 62a of the cover member 60, and the bus bars 40a can be fitted into the recessed portions 62b. When the bus bars 40 and 40a are fitted into the recessed portions 62a and 62b, the terminal connection openings 41 for the bus bars 40 and 40a are externally exposed on the front surface side of the cover member 60 through the openings 63 (FIG. 3).

A duct groove 68 is formed extending between the one-side-edge recessed portions 62a and the another-side-edge recessed portions 62a and 62b in the X direction. The gas duct 30 shown in FIG. 1 is arranged in the duct groove 68. FPC grooves 64 formed extending between the one-side-edge recessed portions 62a and the duct groove 68, and between the another-side-edge recessed portions 62a and 62b and the duct groove 68 in the X direction.

A plurality of connection grooves 65 are formed extending from the one-side-edge recessed portions 62a to one of the FPC groove 64. A plurality of connection grooves 65 are formed extending from the another-side-edge recessed portions 62a and 62b to another FPC groove 64. The pair of FPC boards 50 are arranged in the pair of FPC grooves 64. The plurality of connection parts 55 are arranged in the plurality of connection grooves 65. One of the ends of each of the connection parts 55 is connected to the FPC board 50 by soldering, for example. Another end of each of the connection parts 55 is connected to the bus bar 40 or 40a by spot welding, for example. The circuit board 70 is mounted between the one-side-edge openings 63 and the another-side-edge openings 63 on the front surface of the cover member 60 as shown in FIG. 3.

Thus, the plurality of bus bars 40 and 40a, the pair of FPC boards 50, and the circuit board 70 are mounted to the cover member 60. After that, the cover member 60 is mounted to the upper surface of the battery block 10BB. The terminals 10a and 10b of the plurality of battery cells 10 can be inserted into the terminal connection openings 41 of the plurality of bus bars 40 and 40a. The terminals 10a and 10b are connected to the bus bars 40 and 40a by welding such as spot welding and laser welding in the openings 63 (FIG. 3) of the cover member 60. Thus, the battery cells 10 adjacent to each other are electrically connected through the bus bar 40 to each other. As a result, the plurality of battery cells 10 are connected in series to each other.

The bus bars 40a are attached to the terminal 10a that has the highest potential in the battery block 10BB, and the terminal 10b that has the lowest potential in the battery block 10BB. The bus bars 40a are connected at the openings 63 to power lines through which electric power of the battery module 100 is supplied to an external device or electric power is supplied to the battery module 100 from the external device. The power line will be discussed below.

(1-3) Connection Between FPC Board and Circuit Board

Figure 4:
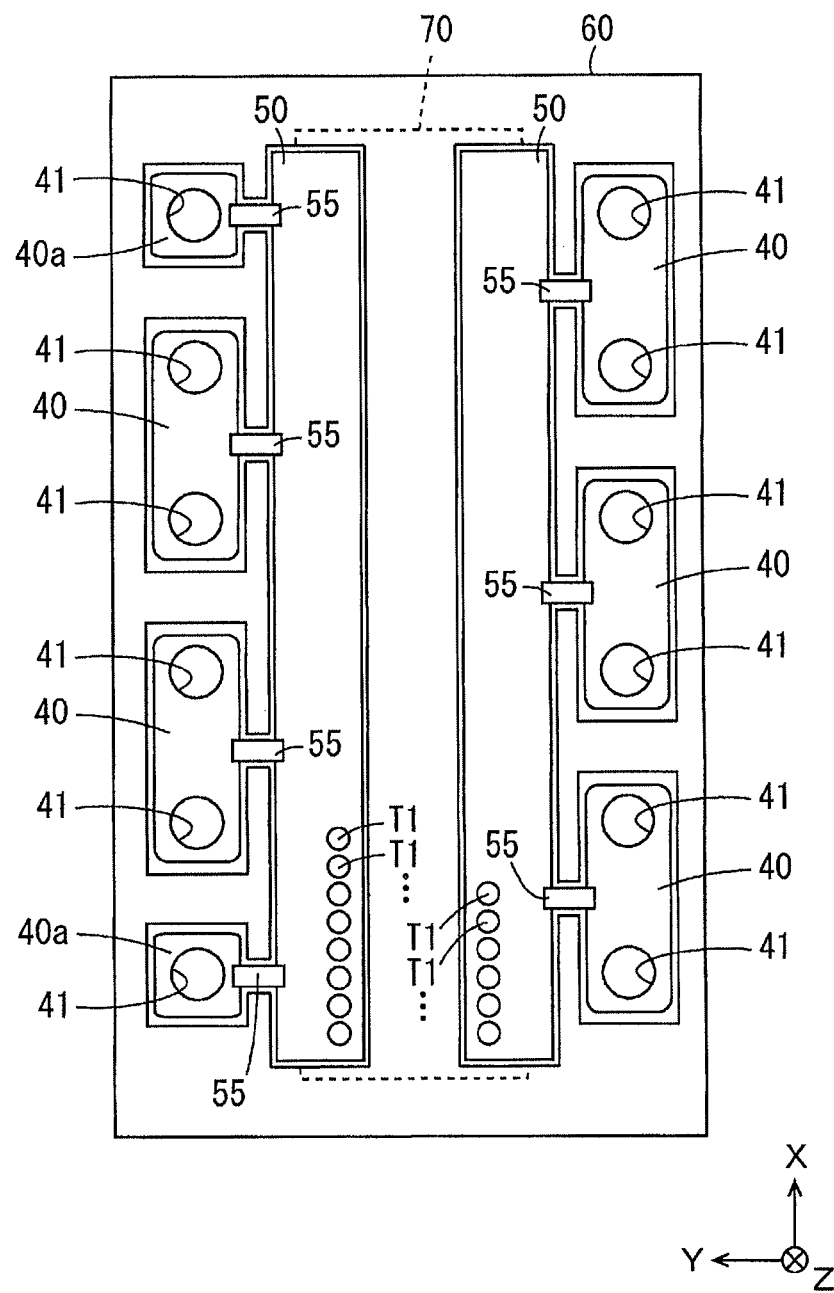
FIG. 4 is a diagram showing the cover member to which a plurality of bus bars, a pair of FPC boards, a plurality of connection parts, and a circuit board are attached as viewed from the bottom side.
Figure 5:
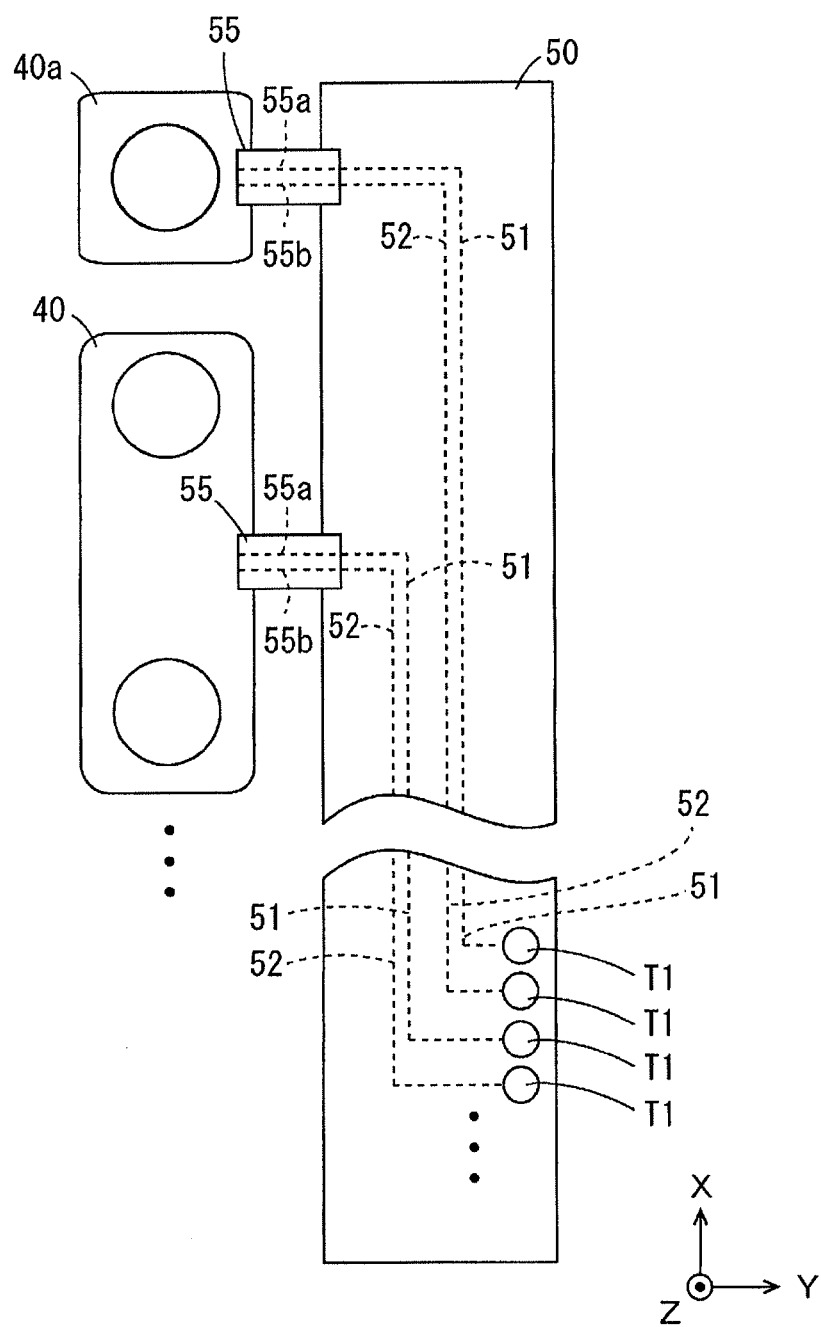
FIG. 5 is a view schematically showing the construction of the FPC board and the connection part.
Figure 6:
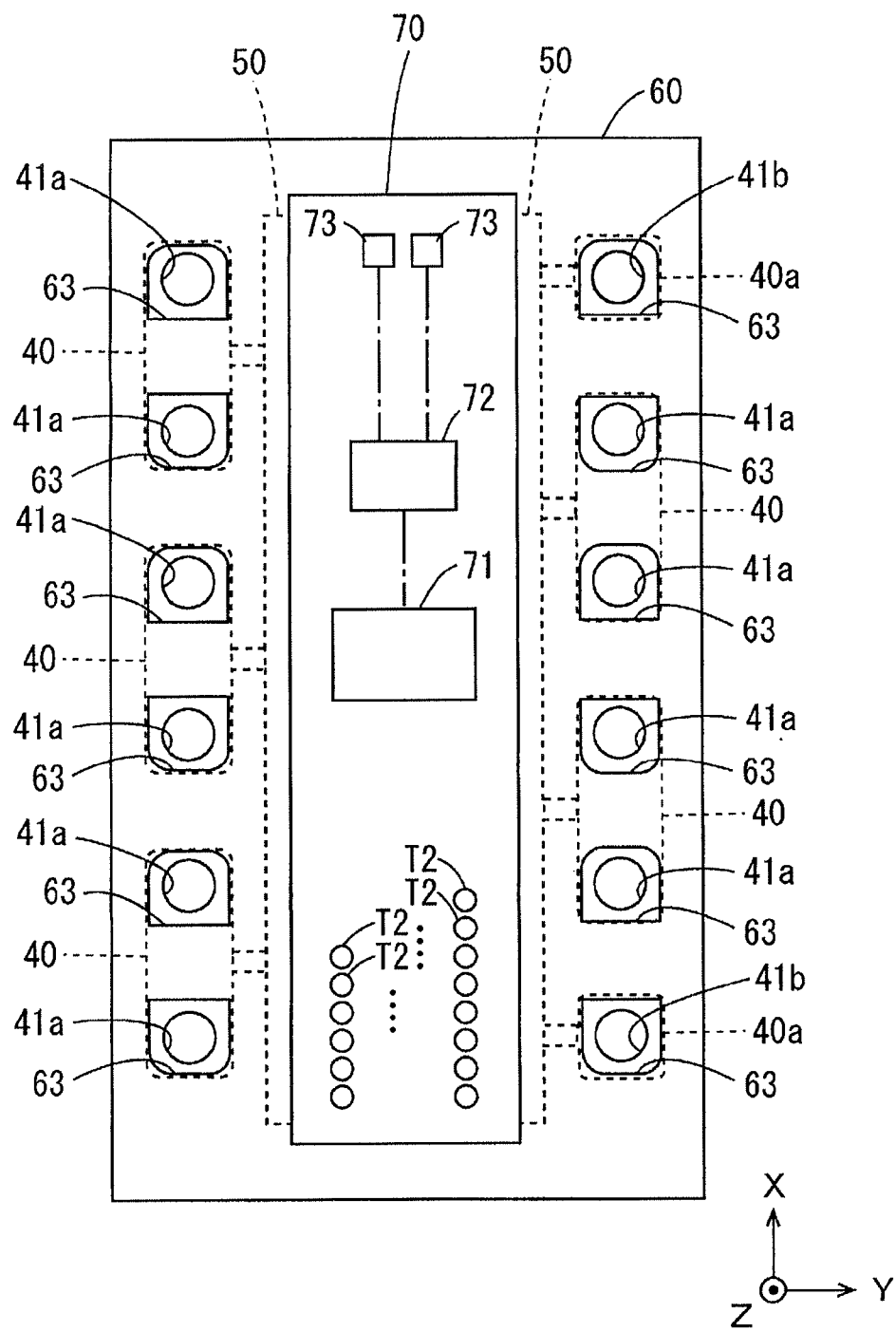
FIG. 6 is a diagram showing the cover member to which the plurality of bus bars, the pair of FPC boards, the plurality of connection parts, and the circuit board are attached as viewed from the top side.

Connection between the FPC boards 50 and the circuit board 70 is now described. FIG. 4 is a diagram showing the cover member 60 to which the plurality of bus bars 40 and 40a, a pair of FPC boards 50, the plurality of connection parts 55, and the circuit board 70 are attached as viewed from the bottom side. FIG. 5 is a view schematically showing the construction of the FPC board 50 and the connection part 55. FIG. 6 is a diagram showing the cover member 60 to which the plurality of bus bars 40 and 40a, a pair of FPC boards 50, the plurality of connection parts 55, and the circuit board 70 are attached as viewed from the top side. Hereinafter, the bus bars 40 that are fitted into the one-side-edge recessed portions 62a are referred to as one-side-edge bus bars 40, while the bus bars 40 that are fitted into the another-side-edge recessed portions 62a are referred to as another-side-edge bus bars 40.

As shown in FIG. 4, one of the FPC boards 50 is connected to the one-side-edge bus bars 40 through the connection parts 55. Similarly, another FPC board 50 is connected to the another-side-edge bus bars 40 and 40a through the connection parts 55. A plurality of terminal portions T1 are arranged on one end part of each of the FPC boards 50.

As shown in FIG. 5, the another FPC board 50 includes a plurality of voltage detection lines 51 and a plurality of discharging lines 52 that are formed conductor patterns corresponding to the bus bars 40 and 40a. The terminal portions T1 are arranged corresponding to the voltage detection lines 51 and discharging lines 52. Each of the connection parts 55 includes junction lines 55a and 55b. One end of each of the voltage detection lines 51 and one end of each of the discharging lines 52 are connected to the corresponding terminal portions T1. Another end of each of the voltage detection lines 51 is electrically connected to the corresponding bus bar 40 or 40a through the junction line 55a of the corresponding connection part 55. Another end of each of the discharging lines 52 is electrically connected to the corresponding bus bar 40 or 40a through the junction line 55b of the corresponding connection part 55.

Similarly, the one of the FPC board 50 includes a plurality of voltage detection lines 51 and a plurality of discharging lines 52 that are formed corresponding to the bus bars 40. A plurality of terminal portions T1 are arranged corresponding to the plurality of voltage detection lines 51 and the plurality of discharging lines 52. One end of each of the voltage detection lines 51 and one end of each of the discharging lines 52 are connected to the corresponding terminal portions T1. Another end of each of the voltage detection lines 51 and another end of each of the discharging lines 52 are electrically connected to the corresponding bus bar 40 through the junction lines 55a and 55b of the corresponding connection part 55.

Connection parts 55 that are formed into a plate or foil shape from a conductive material (e.g., copper) may be used as the connection part 55 that includes the junction lines 55a and 55b. In that case, the voltage detection line 51 and the discharging line 52 are connected to the corresponding bus bar 40 or 40a through the connection parts 55 that are used as the connection part that includes the junction lines.

As shown in FIG. 6, the circuit board 70 includes a voltage detection circuit 71, a communication circuit 72, and a pair of communication connectors 73. The voltage detection circuit 71 and the communication circuit 72 are electrically connected to each other. The pair of communication connectors 73 are electrically connected to the communication circuit 72. The voltage detection circuit 71 detects terminal voltages of the battery cells 10, and provides the communication circuit 72 with the values of the detected terminal voltages. The pair of communication connectors 73 can be connected to communication lines for communication with an external circuit as discussed below. Note that in the case where the communication circuit 72 is connected to the external circuit through a bus, the number of the communication connectors 73 can be one.

The circuit board 70 includes a plurality of terminal portions T2 that overlap the terminal portions T1 of the pair of FPC boards 50. The terminal portions T2 correspond to the terminal portions T1. The terminal portions T2 are connected to the voltage detection circuit 71 or discharging portions DU (FIG. 8) as discussed below.

Figure 7:
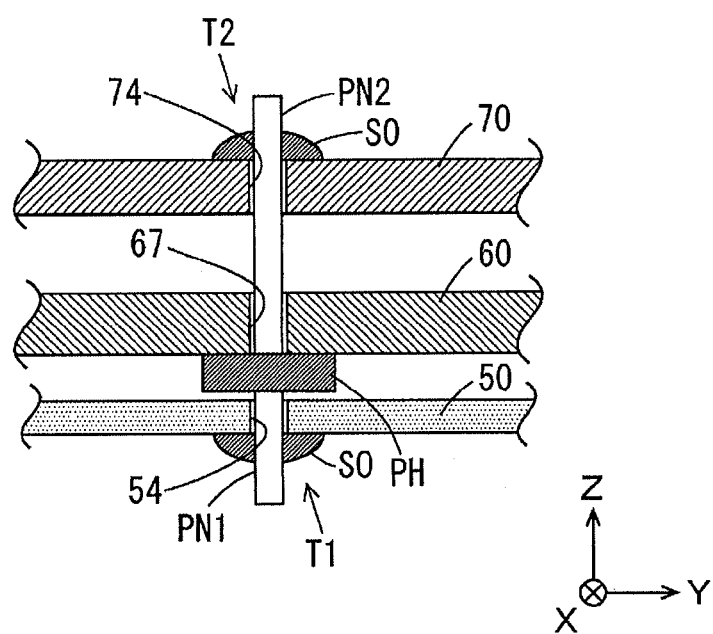
FIG. 7 is a side view schematically showing a connection structure between the FPC board and the circuit board.

FIG. 7 is a side view schematically showing a connection structure between the FPC board 50 and the circuit board 70. The connection structure between one of the terminal portions T1 of the FPC board 50 and one of the terminal portions T2 of the circuit board 70 is shown in FIG. 7.

As shown in FIG. 7, an opening 54 is formed in each of the terminal portions T1 of the FPC board 50, while an opening 74 is formed in each of the terminal portions T2 of the circuit board 70. In addition, an opening 67 is formed in a part of the cover member 60 between each of the terminal portions T1 and each of the terminal portions T2. Connection members PH are interposed between the terminal portions T1 and T2. The connection member PH is an example of first connection member. In this embodiment, a pin header is used as the connection member PH. The connection member PH includes pins PN1 and PN2 that protrude upwards and downward, respectively. A single pin serves both the pins PN1 and PN2. Note that the pin PN1 and PN2 may be separated member as long as the pins PN1 and PN2 are electrically connected to each other. The pin PN1 of the connection member PH is inserted into the opening 54 of the FPC board 50 from the top side of the FPC board 50. The pin PN2 of the connection member PH is inserted into the opening 67 of the cover member 60, and the opening 74 of the circuit board 70 from the bottom side of the cover member 60. After that the pin PN1 of the connection member PH is connected to the terminal portion T1 of the FPC by solder SO, and the pin PN2 is connected to the terminal portion T2 of the circuit board 70 by solder SO.

Thus, the terminal portions T1 of the FPC board 50 are electrically connected to the corresponding terminal portions T2 of the circuit board 70. As a result, the bus bars 40 and 40a are connected through the FPC board 50 to the voltage detection circuit 71 (FIG. 6) on the circuit board 50, and the discharging portions DU (FIG. 8) as discussed below.

If the connection path between the voltage detection circuit 71 and the terminal 10a or 10b of the battery cell 10 has a screw connection structure where two parts are connected by a screw to each other, the contact resistance of the screw connection structure may vary, which in turn will reduce detection accuracy of terminal voltage detected by the voltage detection circuit 71. For example, if the FPC board 50 is connected to the terminals 10a and 10b of the battery cells 10 by screws, variation will occur in the contact resistance between the voltage detection lines 51 and the terminals 10a and 10b. For this reason, in this case, the voltage detection circuit 71 cannot accurately detect terminal voltages of the battery cells 10.

In this embodiment, the connection path between the voltage detection circuit 71 and the terminals 10a and 10b of the battery cells 10 does not have such a screw connection structure. Accordingly, it is possible to prevent contact resistance variation and reduction of detection accuracy of terminal voltages detected by the voltage detection circuit 71.

(1-4) Equalization Process

If variation occurs in charged conditions of the battery cells 10, available charge and discharge ranges of the battery cells 10 will be restricted. For this reason, the essential capacities of the battery cells 10 cannot be sufficiently used. To address this, in the battery module 100, an equalization process is performed for equalization of charged conditions of the battery cells 10. Here, the charged conditions include SOC (charged rate), remaining capacity, open circuit voltage, depth of discharge (DOD), current integrated value, stored electric amount difference, for example.

Figure 8:
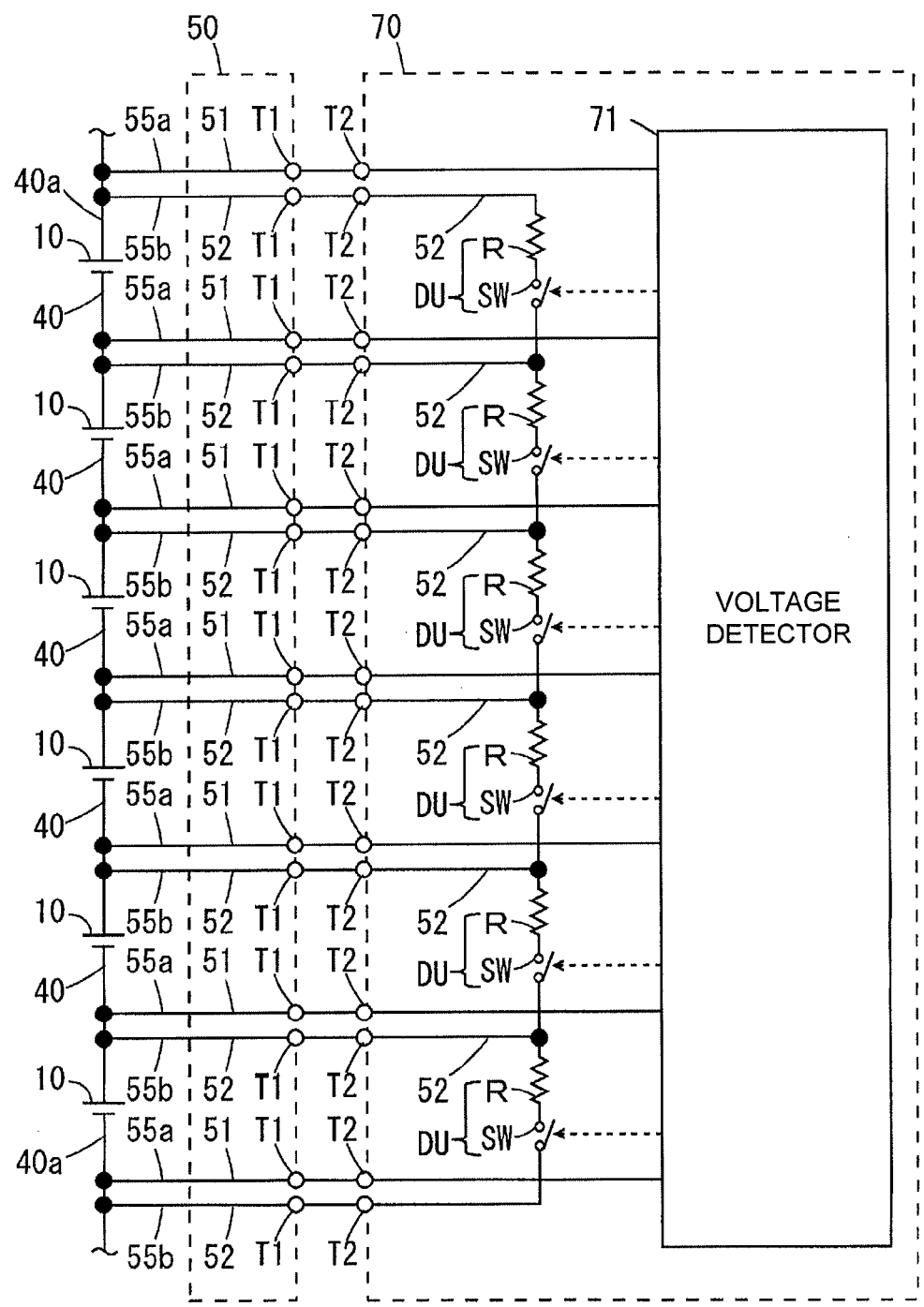
FIG. 8 is a circuit diagram for illustration of electric connection between the plurality of battery cells and the circuit board.

FIG. 8 is a circuit diagram for illustration of electric connection between the plurality of battery cells 10 and the circuit board 70. As shown in FIG. 8, the both terminals of the battery cells 10 are connected to the voltage detection circuit 71 through the bus bars 40 and 40a, the junction lines 55a, and the voltage detection lines 51. The terminal voltages of the battery cells 10 are detected by the voltage detection circuit 71.

The circuit board 70 includes the discharging portions DU corresponding to the battery cells 10. Each of the discharging portions DU is constructed of a series circuit that includes a resistor R and a switching element SW. The both terminals of the battery cells 10 are connected to the corresponding discharging portions DU through the bus bars 40 and 40a, the junction lines 55b, and the discharging lines 52.

The voltage detection circuit 71 controls on/off of the switching element SW based on the detected terminal voltages of the battery cells 10. Specifically, when a terminal voltage of one of the battery cells 10 is higher than terminal voltages of the other battery cells 10, the switching element SW of the discharging portion DU corresponding to the one of the battery cells 10 is turned on. Accordingly, charge of the one of the battery cells 10 is discharged through the resistor R. When the terminal voltage of one of the battery cells 10 becomes substantially equal to the terminal voltages of the other battery cells 10, the switching element SW of the discharging portion DU corresponding to the one of the battery cells 10 is turned off. Terminal voltages of the battery cells 10 can be equalized by repeating the aforementioned process.

To achieve this, a circuit structure for the equalization process is conceivable which includes the bus bars 40 and 40a that are connected to the corresponding discharging portions DU through the junction lines 55a and the voltage detection lines 51. However, in this circuit structure, electric current will flow through the voltage detection line 51 in the equalization process. Accordingly, a voltage drop is produced by a resistor on the voltage detection line 51. For this reason, the voltage detection circuit 71 cannot accurately detect terminal voltages of the battery cells 10. To address this, in this embodiment, the discharging lines 52 are provided separately from the voltage detection lines 51. The bus bars 40 and 40a are connected to the discharging portions DU through the discharging lines 52. According to this construction, a voltage drop is not produced on the voltage detection line 51 in the equalization process. As a result, it is possible to accurately detect terminal voltages of the battery cells 10.

Although the circuit board 70 includes the plurality of discharging portions DU in this embodiment, the present invention is not limited to this. The FPC board 50 may include the plurality of discharging portions DU. Alternatively, the cover member 60 may include the plurality of discharging portions DU. Also, a single line may serve as the voltage detection line 51 and the discharging line 52 as long as charging and discharging operations of the battery cells 10 can be properly controlled.

(1-5) Effects

In the battery module 100 according to this embodiment, the pair of FPC boards 50 and the circuit board 70 overlap the cover member 60, while the pair of FPC boards 50 are connected to the circuit board 70 through the connection members PH. According to this construction, the pair of FPC boards 50 can be connected to the circuit board 70 by simple structures. Therefore, the construction of the battery module 100 can be simplified.

Also, the plurality of bus bars 40 and 40a, the FPC boards 50, and the circuit board 70 are mounted to the cover member 60 in this embodiment. Thus, the plurality of bus bars 40 and 40a, the FPC boards 50, the cover member 60, and the circuit board 70 can be mounted integrally with each other to the battery block 10BB. According to this construction, the battery module 100 can be easily assembled.

Also, the FPC boards 50 overlap the back surface of the cover member 60, while the circuit board 70 overlaps the front surface of the cover member 60 this embodiment. According to this construction, it is possible to compactly arrange the FPC boards 50, the cover member 60, and the circuit board 70 on or above the battery block 10BB. As a result, it is possible to suppress that the battery module 100 becomes large. In addition, since the connection members PH pass through the cover member 60, wiring members are not required which detour around the cover member 60. Accordingly, it is possible to possible to suppress that the construction of the battery module 100 becomes complicated. In addition, the battery module 100 can be easily assembled.

Also, since the FPC boards 50 and the circuit board 70 are provided separately from each other in this embodiment, the shape and the size of the circuit board 70 can be adjusted to any desired shape and size. Accordingly, it is possible to eliminate unrequired parts, and to adjust the circuit board 70 to a required size. As a result, it is possible to reduce the size and the weight of the battery module 100.

Also, since the FPC board 50, the cover member 60, and the circuit board 70 are constructed integrally with each other as a composite component in this embodiment, it is possible to easily wire the battery cells 10 and the circuit board 70 to each other.

1-6

As discussed above, a battery module according to this invention includes a battery block, a cover member, a circuit board, a wiring member, and a first connection member. The battery block includes a plurality of battery cells, and has a terminal surface. Terminals of the plurality of battery cells are arranged on the terminal surface. The cover member is arranged on or above the terminal surface of the battery block. The circuit board overlaps the cover member, and includes a voltage detection circuit for detecting terminal voltages of the plurality of battery cells. The wiring member overlaps the cover member, and is electrically connected to the terminals of the plurality of battery cells. The first connection member electrically connects the circuit board to the wiring member. Here, overlapping the cover member refers to overlapping any part of the cover member.

In the battery module, the terminals of the plurality of battery cells are arranged on the terminal surface of the battery block. The cover member is arranged on or above the terminal surface of the battery block. The circuit board and the wiring member overlap the cover member. In this arrangement, the circuit board can partially or entirely overlap the cover member. Also, the wiring member can partially or entirely overlap the cover member. Also, the cover member, the circuit board, and the wiring member can overlap each other in any order. That is, although the wiring member, the cover member, and the circuit board are arranged the closest to, second closest to, and furthest away from the battery block, respectively, in this embodiment, the present invention is not limited to this. Also, the cover member, the wiring member, and the circuit board can be arranged the closest to, second closest to, and furthest away from the battery block as in another embodiment shown in FIG. 14. The circuit board, the wiring member, and the cover member can be arranged the closest to, second closest to, and furthest away from the battery block as in another embodiment shown in FIG. 16. Also, the circuit board and the wiring member do not necessarily overlap each other.

The wiring members are electrically connected to the terminals of the plurality of battery cells. The circuit board and the wiring members are electrically connected by the first connection members to each other. Thus, the terminals of the plurality of battery cells are electrically connected to the circuit board. The terminal voltages of the plurality of battery cells are detected by the voltage detection circuit of the circuit board.

Thus, the circuit board and wiring members, which overlap the cover member, are connected by the first connection members to each other. Accordingly, the circuit board and the wiring members are connected to each other by the simple structures. As a result, the construction of the battery module can be simplified. In addition, the circuit board, the wiring member, and the cover member can be integrally mounted to the battery block. Therefore, the battery module can be easily assembled.

The cover member has a first surface that faces the terminal surface of the battery block, and a second surface that is located the side opposite to the first surface. The circuit board overlaps the second surface of the cover member. The wiring member overlaps the first surface of the cover member. The first connection members pass through the cover member.

In this case, the circuit board, the wiring member, and the cover member can be compactly arranged on or above the battery block. As a result, it is possible to suppress that the battery module becomes large. Also, since the first connection members pass through the cover member, the circuit board and the wiring member can be easily connected to each other by the simple structures.

In addition, the battery module includes second connection members for electrical connection of the terminals of the plurality of battery cells, and the wiring members are connected to the second connection members. In this case, the wiring members can be easily electrically connected to the terminals of the plurality of battery cells.

In addition, the second connection members are fastened to the cover member. According to this construction, the second connection members can be easily handled. Therefore, the battery module can be more easily assembled.

(1-7) Modified Embodiment (1-7-1) Other Connection Structure

Figure 9:
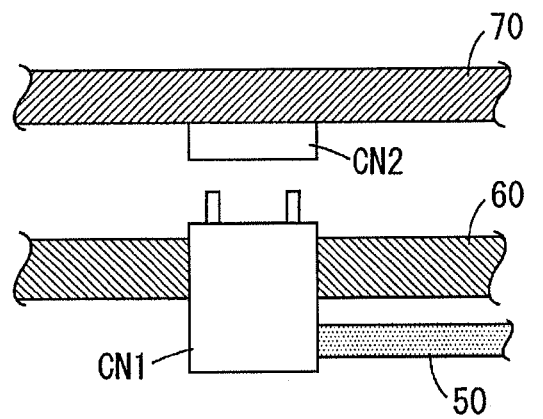
FIG. 9 is a cross-sectional view schematically showing another connection structure between the FPC board and the circuit board.

FIG. 9 is a cross-sectional view schematically showing another connection structure between the FPC board 50 and the circuit board 70. The construction of an embodiment shown in FIG. 9 different from the embodiment shown in FIG. 7 is now described. Connectors CN1 are provided which pass through the cover member 60 in the embodiment shown in FIG. 9. Each of the connectors CN1 is connected to one end of the FPC board 50. In addition, connectors CN2 are arranged on the lower surface of the circuit board 70. The connectors CN2 are electrically connected to the voltage detection circuit 71 (FIG. 6) and the discharging portions DU (FIG. 8). When the connectors CN1 and CN2 are connected to each other, the voltage detection lines 51 of the FPC boards 50 are connected to the voltage detection circuit 71 on the circuit board 70, and the discharging lines 52 are connected to the corresponding discharging portions DU.

According to this embodiment, the FPC boards 50 can be more easily connected to the circuit board 70. Therefore, the battery module 100 can be more easily assembled.

Figure 10:
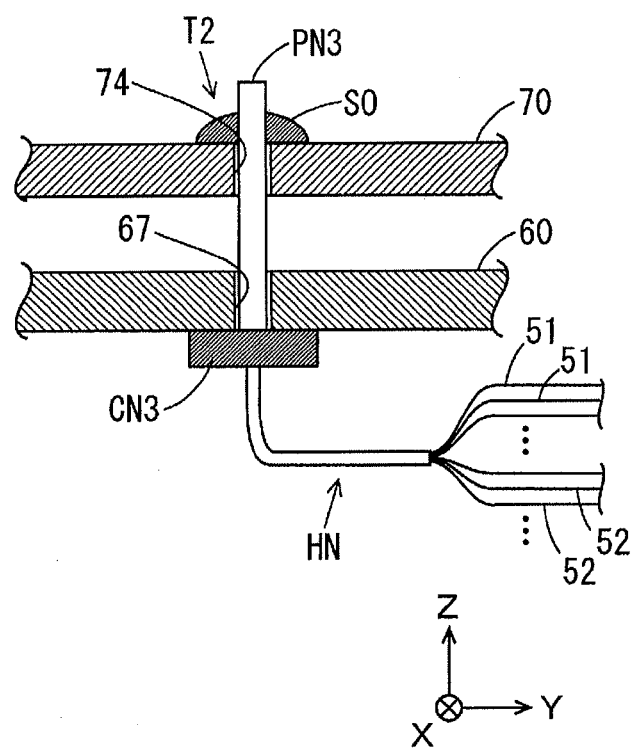
FIG. 10 is a cross-sectional view schematically showing a connection structure between a harness, which includes a plurality of voltage detection lines and a plurality of discharging lines, and a circuit board.

(1) Another Exemplary Construction of Voltage Detection Lines and Discharging Lines Although the FPC boards 50, which include the voltage detection lines 51 and the discharging lines 52, are used as wiring members in the foregoing embodiment, the present invention is not limited to this. Another type of wiring member may be used. For example, a harness that includes the voltage detection lines 51 and the discharging lines 52 can be used as a wiring member. FIG. 10 is a cross-sectional view schematically showing a connection structure between a harness, which includes the voltage detection lines 51 and the discharging lines 52, and the circuit board 70. The construction of an embodiment shown in FIG. 10 different from the embodiment shown in FIG. 7 is now described.

In the embodiment shown in FIG. 10, the voltage detection lines 51 and the discharging lines 52 are tied together into a bundle as the harness HN. The harness HN includes a connector CN3 on its one end. One end of each of the voltage detection lines 51 and one end of each of the discharging lines 52 are connected to the connector CN3. Another end of each of the voltage detection lines 51 and another end of each of the discharging lines 52 are connected to the battery cells 40 and 40a.

The connector CN3 includes a plurality of pins PN3 that correspond to the voltage detection lines 51 and the discharging lines 52, and protrude upward. Only one pin PN3 is shown in FIG. 10. The plurality of pins PN3 of the connector CN1 are inserted into the openings 67 of the cover member 60, and the openings 74 of the circuit board 70 from the bottom side of the cover member 60. After that, the plurality of pin PN3 are connected to the terminal portions T2 of the circuit board 70 by solder SO. Thus, the voltage detection lines 51 and the discharging lines 52 are electrically connected to the corresponding terminal portions T2 of the circuit board 70.

Although the voltage detection lines 51 and the discharging lines 52 are tied together into a bundle as the harness HN in this embodiment, for example, in the case where a relatively small number of voltage detection lines 51 and discharging lines 52 are used, the voltage detection lines 51 and the discharging lines 52 may not be tied together into a bundle, that is, individually covered lines may be used as the voltage detection lines and the discharging lines. In this case, if any of the voltage detection lines 51 or any of the discharging lines 52 is damaged, only the damaged voltage detection line 51 or discharging line 52 can be individually replaced.

(1-7-3) Another Exemplary Construction of Communication Connector

Figure 11:
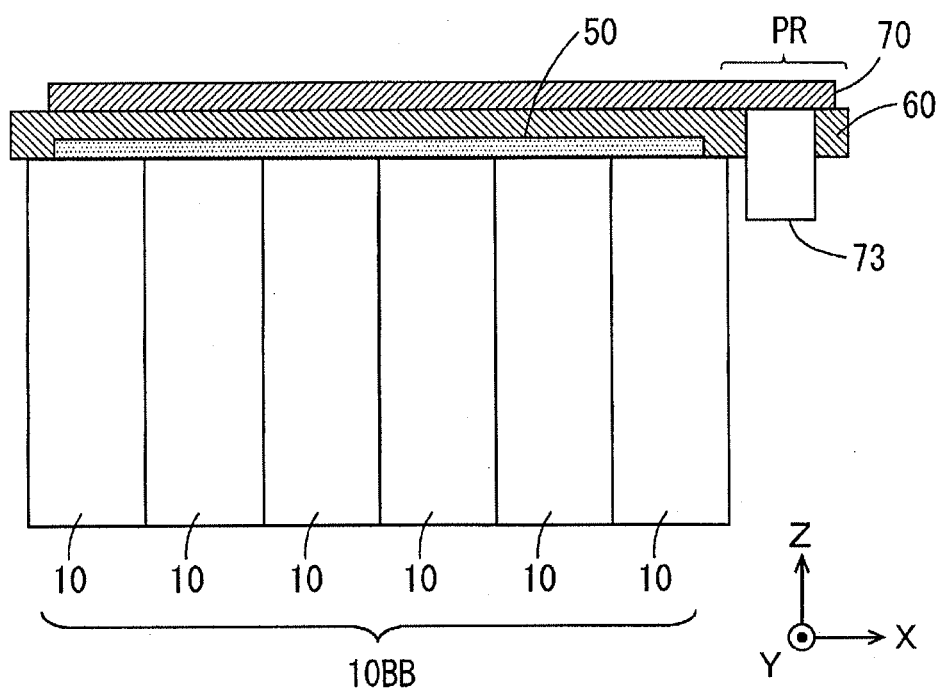
FIG. 11 is a side view schematically showing another example of communication connector.

FIG. 11 is a side view schematically showing another example of communication connector 73. The construction of an embodiment shown in FIG. 11 different from the foregoing embodiment is now described. In the embodiment shown in FIG. 11, the Y-directional length of the cover member 60 is greater than the battery block 10BB. Accordingly, one end of the cover member 60 horizontally protrudes from the upper surface of the battery block 10BB when the cover member 60 is arranged on or above the battery block 10BB. Hereinafter, the part of the cover member 60 that horizontally protrudes from the upper surface of the battery block 10BB is referred as a protrusion part PR. The circuit board 70 extends to the protrusion part PR of the cover member 60. A pair of communication connectors 73 are arranged on one end of the circuit board 70, and protrude downward whereby passing through the protrusion part PR of the cover member 60. Only one communication connector 73 is shown in FIG. 11.

Thus, since the communication connectors 73 are arranged on the lower surface of the circuit board 70, the height of the battery module 100 can be small. As a result, it is possible to save space for the battery module 100.

(1-7-4) Resin Layer

Figure 12:
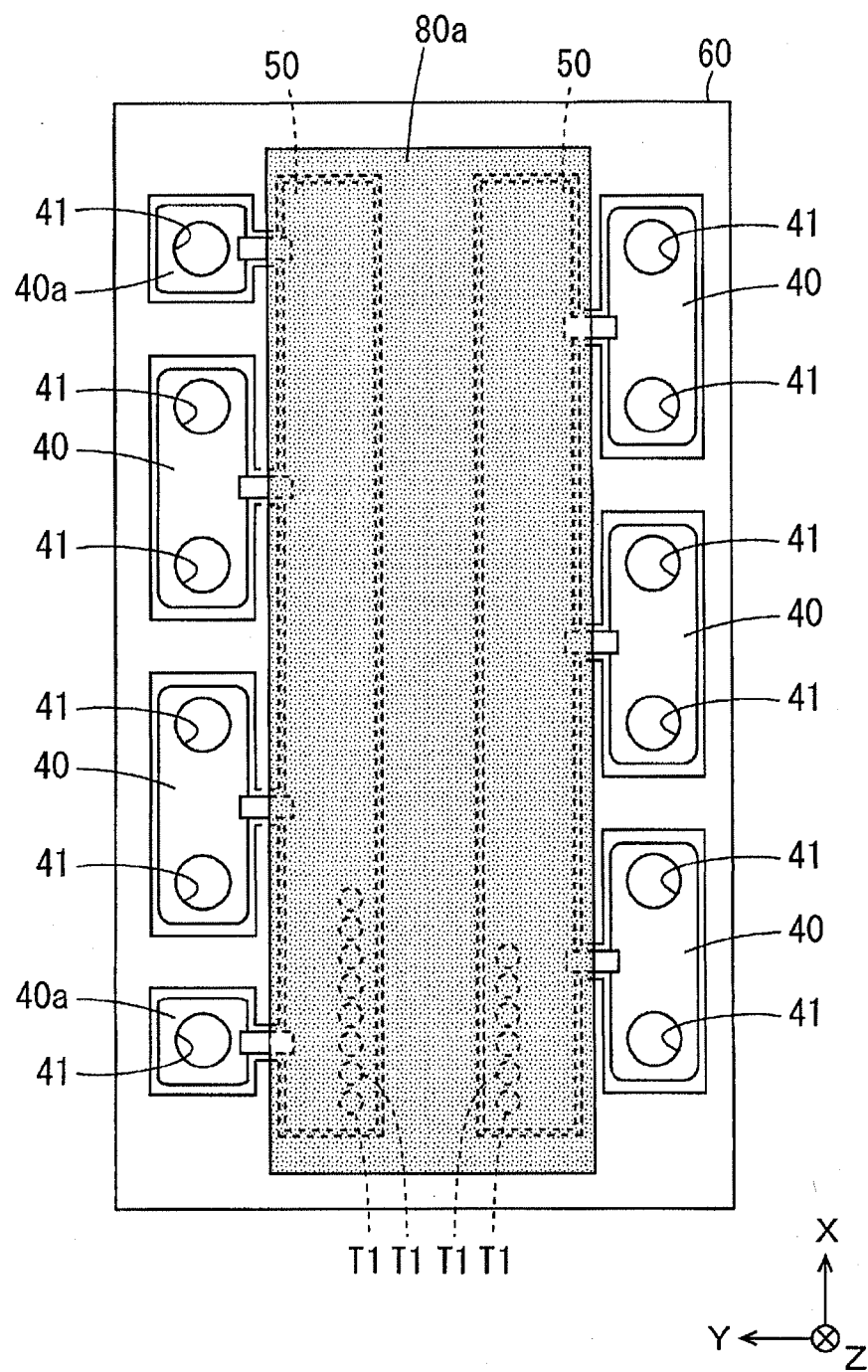
FIG. 12 is a diagram showing FPC boards, a cover member, a circuit board, and a connection member that are integrally formed of resin according to a modified embodiment.
Figure 13:
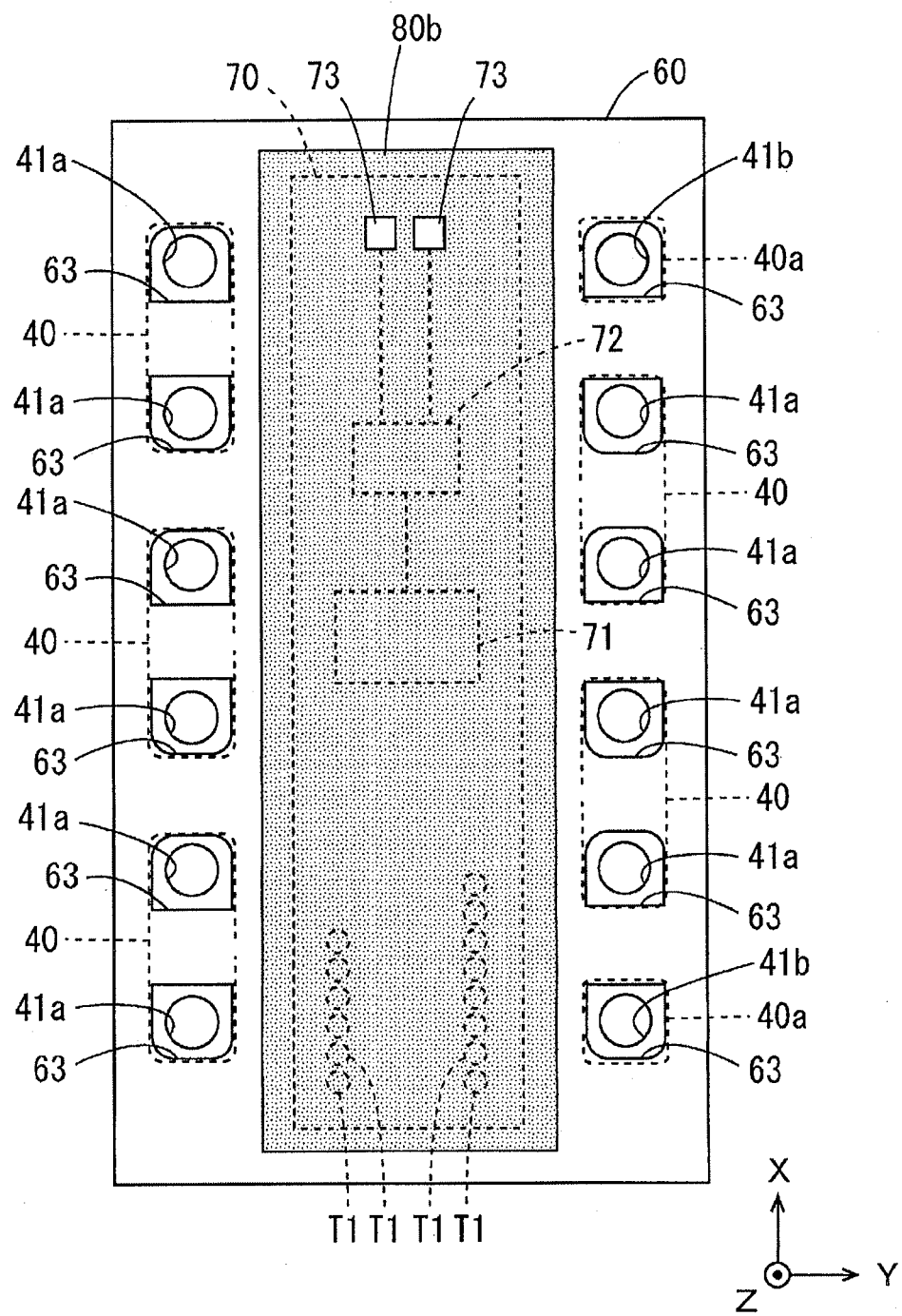
FIG. 13 is a diagram showing the FPC board, the cover member, the circuit boards, and the connection member, which are integrally formed of resin, according to the modified embodiment.

The FPC boards 50, the cover member 60, the circuit board 70, and the connection members PH (FIG. 7) may be integrally formed of resin with the FPC boards 50 and the circuit board 70 being connected to each other by the connection members PH. FIGS. 12 and 13 are diagrams showing the FPC boards 50, the cover member 60, the circuit board 70, and the connection members PH, which are formed integrally with each other of resin, according to a modified embodiment. FIG. 12 is a diagram showing the cover member 60 to which the FPC boards 50 and the circuit board 70 are attached as viewed from the bottom side. FIG. 13 is a diagram showing the cover member 60 to which the FPC boards 50 and the circuit board 70 are attached as viewed from the bottom side.

As shown in FIG. 12, a resin layer 80a is formed on the back surface of the cover member 60, and covers the pair of FPC boards 50. Also, as shown in FIG. 13, a resin layer 80*b* is formed on the front surface of the cover member 60, and covers the circuit board 70 except the communication connectors 73. According to this construction, the FPC boards 50, the cover member 60, the circuit board 70, and the connection members PH are integrally constructed.

According to this embodiment, it is possible to prevent condensation from forming on conductive parts of the FPC boards 50, the circuit board 70, and the connection members PH. As a result, it is possible to prevent a short circuit in the FPC boards 50, the circuit board 70, and the connection members PH. In addition, since the FPC boards 50, the circuit board 70, and the connection members PH are securely fastened to the cover member 60, the FPC boards 50, the circuit board 70, and the connection members PH can be more easily handled.

As discussed above, in this embodiment, the cover member, the circuit board, the wiring members, and the first connection members are formed integrally with each other of resin. According to this construction, the circuit board, the wiring members, and the first connection members can be easily handled. Therefore, the battery module can be more easily assembled.

In the case where the FPC board 50 or the circuit board 70 has a structure for preventing condensation, only one of the resin layers 80*a* and 80*b* may be provided. In addition, parts of the back surface of the cover member 60 corresponding to the bus bars 40 and 40*a* except the terminal connection openings 41 may be covered with by the resin layer 80*a*. In this case, it is possible to prevent a short circuit from forming between the bus bars 40 and 40*a*. In addition, since the the bus bars 40 and 40*a* are securely fastened to the cover member 60, the bus bars 40 and 40*a* can be more easily handled.

In addition, in the embodiment shown in FIG. 9, the resin layer may be formed covering the connector CN1 and CN2. In addition, in the embodiment shown in FIG. 10, the resin layer may be formed covering the harness HN.

(2) Second Embodiment

The construction of a battery module 100 according to a second embodiment of the present invention different from the foregoing first embodiment is now described.

(2-1) Construction

Figure 14:
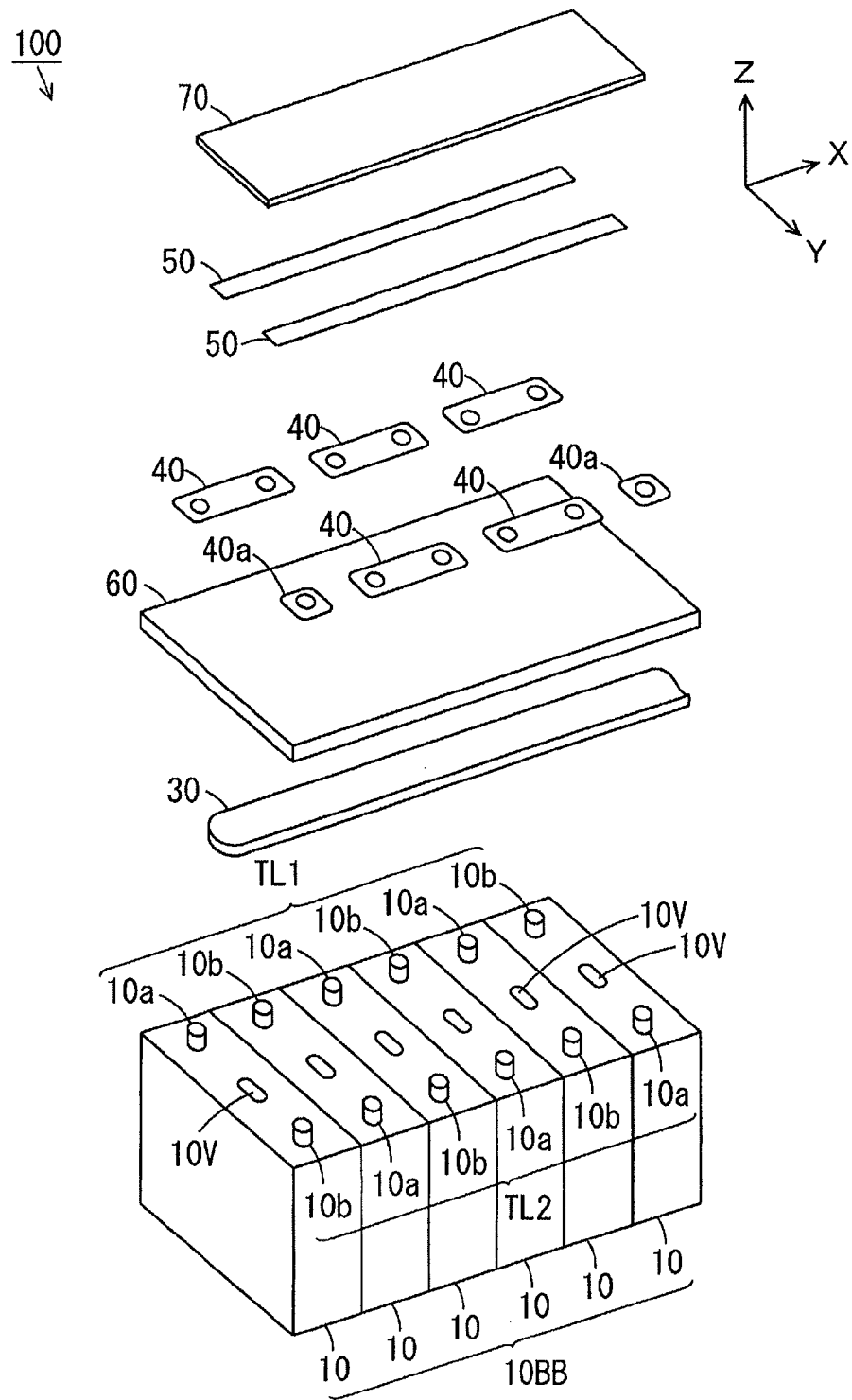
FIG. 14 is an exploded perspective view showing the construction of a battery module according to a second embodiment.

FIG. 14 is an exploded perspective view showing the construction of the battery module 100 according to the second embodiment. In the battery module 100 shown in FIG. 14, the bus bars 40 and 40*a*, and the pair of FPC boards 50 are arranged on the upper surface of the cover member 60. In this embodiment, the back surface of the cover member 60 faces upward. In this embodiment, the front surface of the cover member 60 is an example of first surface of the cover member, while the back surface of the cover member 60 is an example of second surface of the cover member. The duct groove 68 (FIG. 2) is formed on the front surface of the cover member 60.

Figure 15:
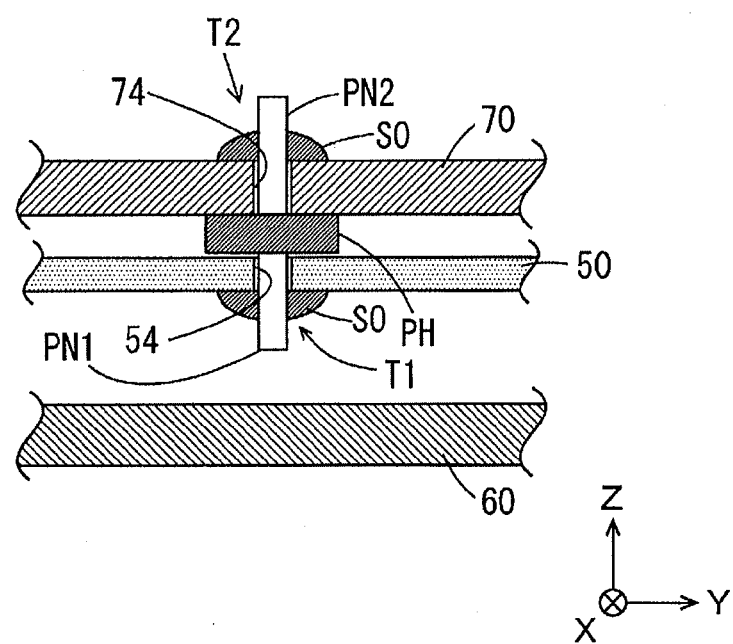
FIG. 15 is a cross-sectional view schematically showing a connection structure between the FPC board and the circuit board in the battery module shown in FIG. 14.

FIG. 15 is a cross-sectional view schematically showing a connection structure between the FPC board 50 and the circuit board 70 in the battery module 100 shown in FIG. 14. As shown in FIG. 15, the pin PN1 of the connection member PH is inserted into the opening 54 of the FPC board 50 from the top side of the FPC board 50. The pin PN2 of the connection member PH is inserted into the opening 74 of the circuit board 70 from the bottom side of the circuit board 70. After that the pin PN1 of the connection member PH is connected to the terminal portion T1 of the FPC board 50 by solder SO, and the pin PN2 is connected to the terminal portion T2 of the circuit board 70 by solder SO. Thus, the terminal portions T1 of the FPC board 50 are electrically connected to the corresponding terminal portions T2 of the circuit board 70.

(2-2) Effects

Also, according to the battery module 100 of this embodiment, similar to the foregoing first embodiment, the construction of the battery module 100 can be simplified, and the battery module 100 can be easily assembled. In addition, it is possible to compactly arrange the FPC boards 50, the cover member 60, and the circuit board 70 on or above the battery block 10BB. Additionally, it is possible to easily wire the battery cells 10 and the circuit board 70 to each other.

In the battery module 100 shown in FIGS. 14 and 15, the FPC board 50 can be connected to the circuit board 70 by the similar connection structure shown in the embodiment of FIG. 9. Alternatively, the harness HN similar to the embodiment shown in FIG. 10 can be used instead of the FPC board 50. In addition, the communication connector 73 can be arranged on the lower surface of the circuit board 70 similarly to the embodiment shown in FIG. 11. The FPC boards 50, the cover member 60, the circuit board 70, and the connection members PH may be formed integrally with each other of resin similarly to the embodiment shown in FIGS. 12 and 13.

(2-3)

As discussed above, the cover member has a first surface that faces the terminal surface of the battery block, and a second surface that is located the side opposite to the first surface. The circuit board overlaps the second surface of the cover member. The wiring member overlaps the second surface of the cover member, and is interposed between the cover member and the circuit board. Here, overlapping the first surface of the cover member refers to overlapping at least a part of the first surface of the cover member. Also, overlapping the second surface of the cover member refers to overlapping at least a part of the second surface of the cover member.

In this case, the circuit board, the wiring member, and the cover member can be compactly arranged on or above the battery block. As a result, it is possible to suppress that the battery module becomes large. In addition, since the cover member is not interposed between the circuit board and the wiring member, the circuit board and the wiring member can be simply and easily connected.

(3) Third Embodiment

The construction of a battery module 100 according to a third embodiment of the present invention different from the foregoing first embodiment is now described.

(3-1) Construction

Figure 16:
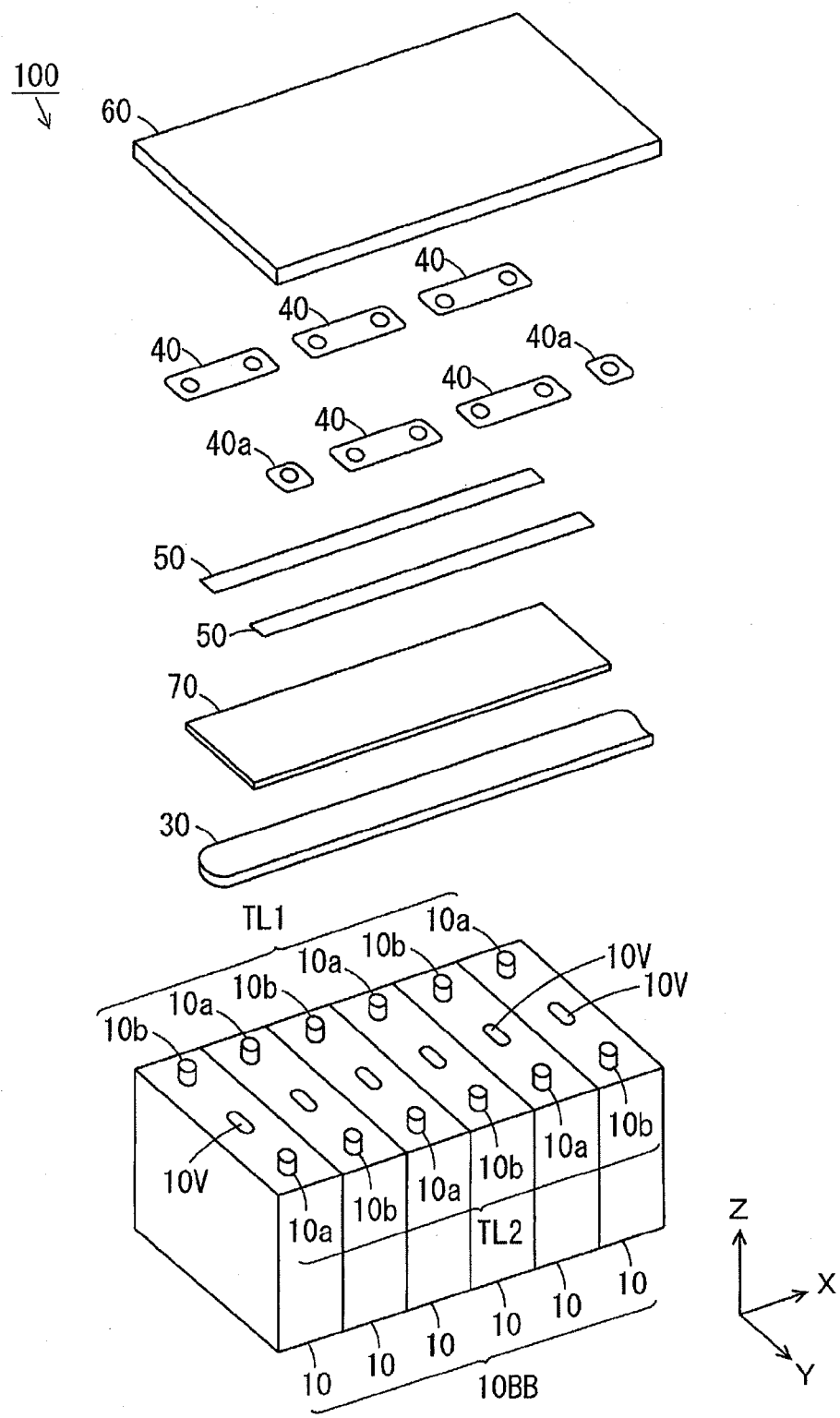
FIG. 16 is an exploded perspective view showing the construction of a battery module according to a third embodiment.

FIG. 16 is an exploded perspective view showing the construction of the battery module 100 according to the third embodiment. In the battery module 100 shown in FIG. 16, the circuit board 70 is arranged under the pair of FPC boards 50, and overlaps the lower surface of the cover member 60. In this embodiment, the back surface of the cover member 60 is an example of first surface of the cover member, while the front surface of the cover member 60 is an example of second surface of the cover member. In this embodiment, the duct groove 68 (FIG. 2) may be omitted.

Figure 17:
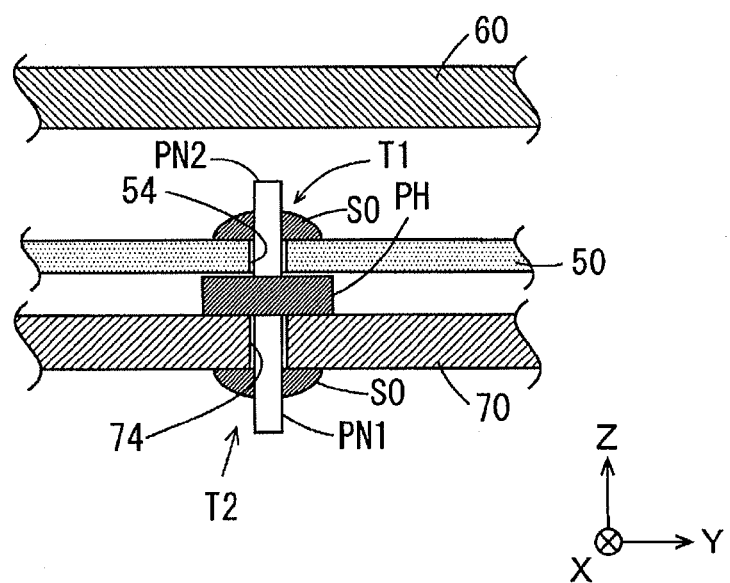
FIG. 17 is a cross-sectional view schematically showing a connection structure between the FPC board and the circuit board in the battery module shown in FIG. 16.

FIG. 17 is a cross-sectional view schematically showing a connection structure between the FPC board 50 and the circuit board 70 in the battery module 100 shown in FIG. 16. As shown in FIG. 17, the pin PN1 of the connection member PH is inserted into the opening 74 of the circuit board 70 from the top side of the circuit board 70. The pin PN2 of the connection member PH is inserted into the opening 54 of the FPC board 50 from the bottom side of the FPC board 50. After that the pin PN1 of the connection member PH is connected to the terminal portion T2 of the circuit board 70 by solder SO, and the pin PN2 is connected to the terminal portion T1 of the FPC board 50 by solder SO. Thus, the terminal portions T1 of the FPC board 50 are electrically connected to the corresponding terminal portions T2 of the circuit board 70.

(3-2) Effects

Also, according to the battery module 100 of this embodiment, similar to the foregoing first embodiment, the construction of the battery module 100 can be simplified, and the battery module 100 can be easily assembled. In addition, it is possible to compactly arrange the FPC boards 50, the cover member 60, and the circuit board 70 on or above the battery block 10BB. Additionally, it is possible to easily wire the battery cells 10 and the circuit board 70 to each other.

In the battery module 100 shown in FIGS. 16 and 17, the FPC board 50 can be connected to the circuit board 70 by the similar connection structure shown in the embodiment of FIG. 9. Alternatively, the harness HN similar to the embodiment shown in FIG. 10 can be used instead of the FPC board 50. In addition, the communication connector 73 can be arranged on the lower surface of the circuit board 70 similarly to the embodiment shown in FIG. 11. The FPC boards 50, the cover member 60, the circuit board 70, and the connection members PH may be formed integrally with each other of resin similarly to the embodiment shown in FIGS. 12 and 13.

(3-3)

As discussed above, the cover member has a first surface that faces the terminal surface of the battery block, and a second surface that is located the side opposite to the first surface. The circuit board overlaps the first surface of the cover member. The wiring member overlaps the first surface of the cover member, and is interposed between the cover member and the circuit board.

In this case, the circuit board, the wiring member, and the cover member can be compactly arranged on or above the battery block. As a result, it is possible to suppress that the battery module becomes large. In addition, since the cover member is not interposed between the circuit board and the wiring member, the circuit board and the wiring member can be simply and easily connected.

(4) Fourth Embodiment

The construction of a battery module 100 according to a fourth embodiment of the present invention different from the foregoing first embodiment is now described.

(4-1) Construction

Figure 18:
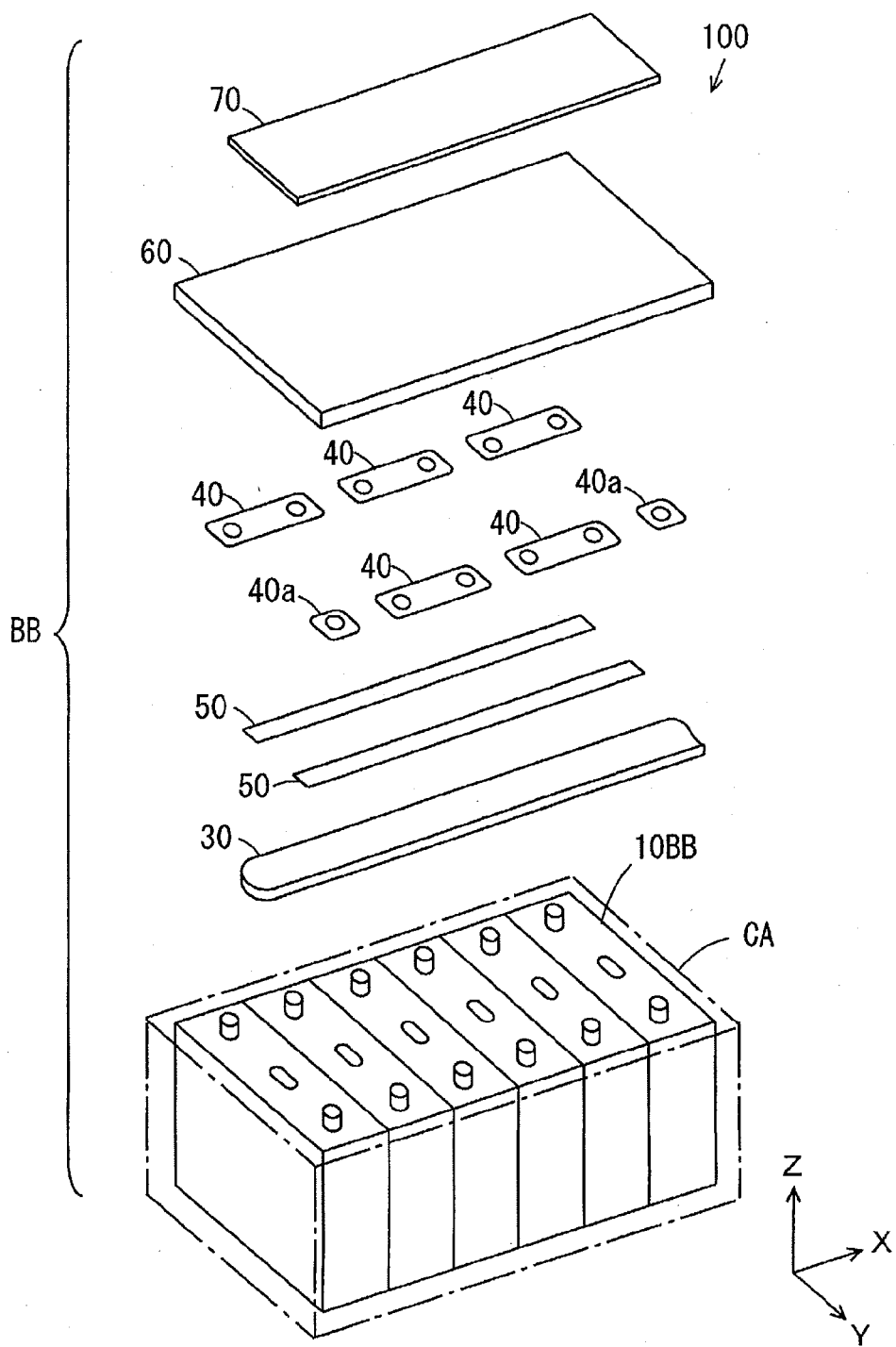
FIG. 18 is an exploded perspective view showing the construction of a battery module according to a fourth embodiment.

FIG. 18 is an exploded perspective view showing the construction of the battery module 100 according to the fourth embodiment. In this embodiment, the battery block 10BB is accommodated in a casing CA. The casing CA opens upward. The cover member 60 is fitted into and attached to the opening of the casing CA whereby closing the opening of the casing CA. Thus, a battery box BB is assembled which accommodates the battery block 10BB. In this embodiment, the cover member 60 may be attached to the casing CA by screws, adhesive, or the like. In this case, the cover member 60 can be securely attached to the casing CA. The cover member 60 is not necessarily fitted into the opening of the casing CA.

(4-2) Effects

According to this embodiment, since the battery box BB is assembled which accommodates the battery block 10BB, it is possible increase the strength of the battery module 100. In addition, since the battery block 10BB of the battery module 100 is fastened to the casing CA of the battery box BB, and the cover member 60 is fitted into the opening of the casing CA, the battery block 10BB and the cover member 60 can be securely fastened.

Additionally, since the battery block 10BB is shielded by the casing CA and the cover member 60 from the outside, it is possible to prevent that physical loads from the outside are applied to the battery block 10BB. As a result, it is possible to avoid deformation, damage, and the like to the battery block 10BB.

(4-3) Modified Embodiment

In this embodiment, the opening of the casing CA is closed by the cover member 60. Accordingly, the battery box BB may be filled with the resin. In this case, it is possible to prevent condensation from forming on the battery cells 10. Also, the resin in the battery box BB can have effect on the thermal conductive characteristics of the battery module 100. For example, when the battery box BB is filled with a resin that has a thermal conductivity higher than air, the heat in the battery box BB can be dissipated to the outside. On the other hand, when the battery box BB is filled with a resin that has a thermal conductivity lower than air, the battery box BB can be thermally shielded from heat from the outside.

In addition, although the battery box BB is closed, in the case where at least one of the casing CA and the cover member 60 have openings, air can be discharged from the battery box BB. In this case, the gas duct 30 can be omitted from the battery module 100.

Although the battery box BB is constructed which accommodates the battery module 100 according to the foregoing first embodiment in this embodiment, the battery box BB can be similarly constructed which accommodates the battery module 100 according to the foregoing second or third embodiment.

(5) Fifth Embodiment

A battery system according to a fifth embodiment of the present invention is now described. The battery system according to this embodiment includes the battery module 100 according to the foregoing first, second or third embodiment.

(5-1) Construction

Figure 19:
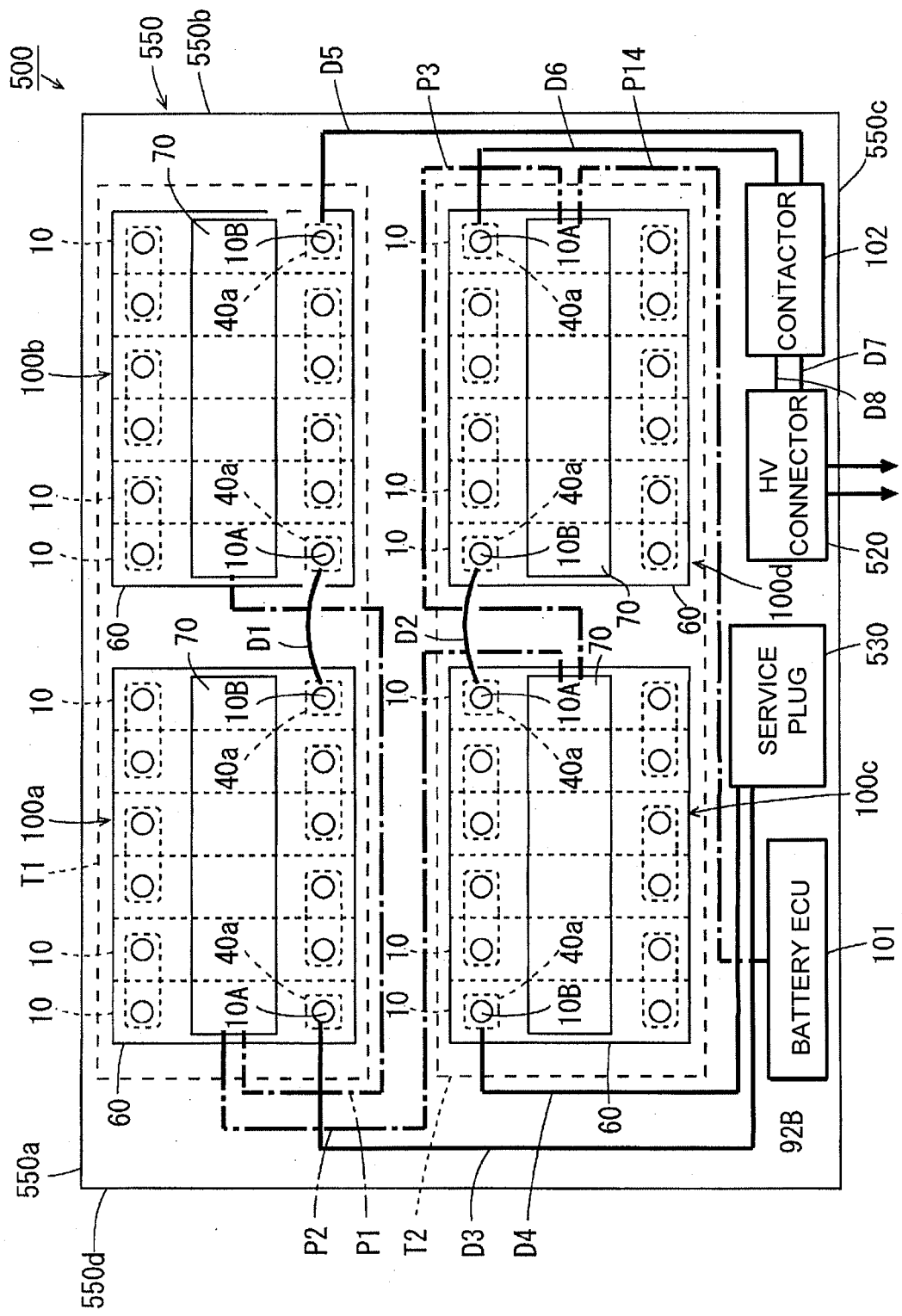
FIG. 19 is a plan view schematically showing the construction of a battery system according to a fifth embodiment.

FIG. 1 is a plan view schematically showing the construction of a battery system according to the fifth embodiment. As shown in FIG. 19, the battery system 500 includes battery modules 100a, 100b, 100c and 100d, a battery ECU 101, a contactor 102, an HV (High Voltage) connector 520, and a service plug 530. The battery modules 100a to 100d have construction similar to the battery module 100 according to the first embodiment. Note that the battery module 100 according to the second or third embodiment can be used as the battery modules 100a to 100d. In addition, the battery block 10BB of each of the battery modules 100a to 100d may be accommodated in the battery box BB similar to the foregoing fourth embodiment. The number of and the arrangement of the battery modules 100a to 100d are not limited to this embodiment, but can be suitably modified.

Hereinafter, in each of the battery modules 100a to 100d, the terminal 10a that has the highest potential is referred to as high-potential-side terminal 10A, while the terminal 10b that has the lowest potential is referred to as low-side potential terminal 10B. Also, the battery cell 10 that includes the high-potential-side terminal 10A is referred to as high-potential-side cell 10, while the battery cell 10 that includes the low-potential-side terminal 10B is referred to as low-potential-side cell 10.

A box-shaped casing 550 accommodates the battery modules 100a to 100d, the battery ECU 101, the contactor 102, the HV connector 520, and the service plug 530. The casing 550 includes side surface portions 550a, 550b, 550c, and 550d. The side surface portions 550a and 550c are parallel to each other. The side surface portions 550b and 550d are parallel to each other, and perpendicular to the side surface portions 550a and 550c.

In the casing 550, the battery modules 100a and 100b are aligned along the side surface portion 550a. In this case, when the battery modules 100a and 100b are placed, the low-potential-side cell 10 of the battery module 100a, and the high-potential-side cell 10 of the battery module 100b are positioned adjacent to and space away from each other. The high-potential-side cell 10 of the battery module 100a faces the side surface portion 550d. The low-potential-side cell 10 of the battery module 100b faces the side surface portion 550b.

The battery modules 100c and 100d are arranged beside the battery modules 100a and 100, respectively, and are aligned along one line. In this case, when the battery modules 100c and 100d are placed, the high-potential-side cell 10 of the battery module 100c, and the low-potential-side cell 10 of the battery module 100d are positioned adjacent to and space away from each other. The low-potential-side cell 10 of the battery module 100c faces the side surface portion 550d. The high-potential-side cell 10 of the battery module 100d faces the side surface portion 550b. The battery ECU 101, the service plug 530, the HV connector 520, and the contactor 102 are arranged in this order in the space between the battery modules 100c and 100d, and the side surface portion 550c from the side surface portion 550d to the side surface portion 550b.

One end of a power line D1 is connected to the bus bar 40a that is attached to the low-potential-side terminal 10B of the battery module 100a. Another end of the power line D1 is connected to the bus bar 40a that is attached to the high-potential-side terminal 10A of the battery module 100b. Thus, the low-potential-side and high-potential-side terminals 10B and 10A of the battery modules 100a and 100b are electrically connected to each other. Harnesses or the lead wire lines can be used as the power lines D1 and D2, D3 to D6 discussed below.

One end of the power line D2 is connected to the bus bar 40a that is attached to the high-potential-side terminal 10A of the battery module 100c. Another end of the power line D2 is connected to the bus bar 40a that is attached to the low-potential-side terminal 10B of the battery module 100d. Thus, the high-potential-side and low-potential-side terminals 10A and 10B of the battery modules 100c and 100d are electrically connected to each other.

One end of the power line D3 is connected to the bus bar 40a that is attached to the high-potential-side terminal 10A of the battery module 100a. One end of the power line D4 is connected to the bus bar 40a that is attached to the low-potential-side terminal 10B of the battery module 100c. Another ends of the power lines D3 and D4 are connected to the service plug 530.

When the service plug 530 is turned on, the battery modules 100a, 100b, 100c, and 100d are connected in series to each other. In this case, the potential of the high-potential-side terminal 10A of the battery module 100d is the highest, while the potential of the low-potential-side terminal 10B of the battery module 100b is the lowest.

The service plug 530 can be turned off by operators, for example, in battery system 500 maintenance. When the service plug 530 is turned off, a series circuit of the battery modules 100a and 100b, and a series circuit of the battery modules 100c and 100d are electrically separated from each other. In this case, the current path between the battery modules 100a to 100d is disconnected. According to this construction, maintenance safety can be secured.

One end of the power line D5 is connected to the bus bar 40a that is attached to the low-potential-side terminal 10B of the battery module 100b. One end of the power line D6 is connected to the bus bar 40a that is attached to the high-potential-side terminal 10A of the battery module 100d. Another ends of the power lines D5 and D6 are connected to the contactor 102. The contactor 102 is connected to the HV connector 520 through the power lines D7 and D8. The HV connector 520 can be connected to an external load.

When the contactor 102 is turned on, the battery module 100b is connected to the HV connector 520 through the power lines D5 and D7, and the battery module 100d is connected to the HV connector 520 through the power lines D6 and D8. Accordingly, electric power can be supplied to the load from the battery modules 100a to 100d. Also, when the contactor 102 is turned on, the battery modules 100a to 100d can be charged. When the contactor 102 is turned off, the battery modules 100b and 100d are disconnected from the HV connector 520.

In battery system 500 maintenance, both the contactor 102 and the service plug 530 can be turned off by operators. In this case, the current path between the battery modules 100a to 100d is surely disconnected. According to this construction, maintenance safety can be sufficiently secured. In addition, in the case where voltages of the battery modules 100a to 100d are equal to each other, the total voltage of the series circuit of the battery modules 100a and 100b is equal to the total voltage of the series circuit of the battery modules 100c and 100d. In this case, it is possible to avoid that high voltage is produced in the battery system 500 in maintenance.

One end of a communication line P1 is connected to one of the communication connectors 73 (see FIG. 6 or 11) that are arranged on the circuit board 70 of the battery module 100a. Another end of the communication line P1 is connected to one of the communication connectors 73 that are arranged on the circuit board 70 of the battery module 100b. Thus, the communication circuit 72 (FIG. 6) of the battery module 100a is connected to and can communicate with the communication circuit 72 of the battery module 100b.

One end of a communication line P2 is connected to another of the communication connectors 73 (see FIG. 6 or 11) that are arranged on the circuit board 70 of the battery module 100a. Another end of the communication line P2 is connected to one of the communication connectors 73 that are arranged on the circuit board 70 of the battery module 100c. Thus, the communication circuit 72 (FIG. 6) of the battery module 100a is connected to and can communicate with the communication circuit 72 of the battery module 100c.

One end of a communication line P3 is connected to another of the communication connectors 73 (see FIG. 6 or 11) that are arranged on the circuit board 70 of the battery module 100c. Another end of the communication line P3 is connected to one of the communication connectors 73 that are arranged on the circuit board 70 of the battery module 100d. Thus, the communication circuit 72 (FIG. 6) of the battery module 100c is connected to and can communicate with the communication circuit 72 of the battery module 100d.

One end of a communication line P4 is connected to another of the communication connectors 73 (see FIG. 6 or 11) that are arranged on the circuit board 70 of the battery module 100d. Another end of the communication line P4 is connected to the battery ECU 101. A bus can be constructed of the communication lines P1 to P4. A harness can be used as the communication lines P1 to P4, for example.

The circuits 72 of the battery modules 100a to 100d, and the battery ECU 101 can communicate with each other through the communication lines P1 to P4. Each of the communication circuits 72 can provide data relating to the battery cells 10 (e.g., terminal voltage, electric current, temperature, etc.) to other communication circuits 72 or the battery ECU 101. Hereinafter, the data relating to the battery cells 10 is referred to as cell data.

The battery ECU 101 can calculate charged amounts of the battery cells 10 in the battery modules 100a to 100d based on the cell data that is provided from the communication circuits 72 of the battery modules 100a to 100d, for example, and can control charging-and-discharging operations of the battery modules 100a to 100d based on the charged amounts. In addition, the battery ECU 101 can detect abnormal conditions of the battery modules 100a to 100d based on the cell data that is provided from the communication circuits 72 of the battery modules 100a to 100d. The abnormal conditions of the battery modules 100a to 100d include overdischarge, overcharge, and abnormal temperature of the battery cell 10, and the like, for example.

Although the battery ECU 101 calculates the charged amounts of the aforementioned battery cells 10, and detects overdischarge, overcharge, and abnormal temperature of the battery cell 10 and the like in this embodiment, the present invention is not limited to this. The communication circuits 72 of the battery modules 100a to 100d may detect overdischarge, overcharge, and abnormal temperature of the battery cell 10 and the like, and provide the detection result to the battery ECU 101.

(5-2) Effects

The battery system 500 according to this embodiment includes the battery modules 100 according to the foregoing first or second embodiment. Accordingly, the construction of the battery module 100 can be simplified, and the battery module 100 can be easily assembled. As a result, it is possible to reduce the manufacturing cost of the battery system 500.

(5-3)

The battery system according to this embodiment includes one or a plurality of battery modules, and the one or at least one of the plurality of battery modules is the aforementioned battery module.

Since the one or at least one of the plurality of battery modules is the aforementioned battery module in the battery system, the construction of the battery module can be simplified, and the battery module can be easily assembled. As a result, it is possible to reduce the manufacturing cost of the battery system.

(6) Sixth Embodiment

An electric vehicle according to the sixth embodiment of the present invention is now described. The electric vehicle according to this embodiment includes the battery system 500 according to the fifth embodiment. Here, an electric car is described as an exemplary electric vehicle.

(6-1) Construction and Operation

Figure 20:
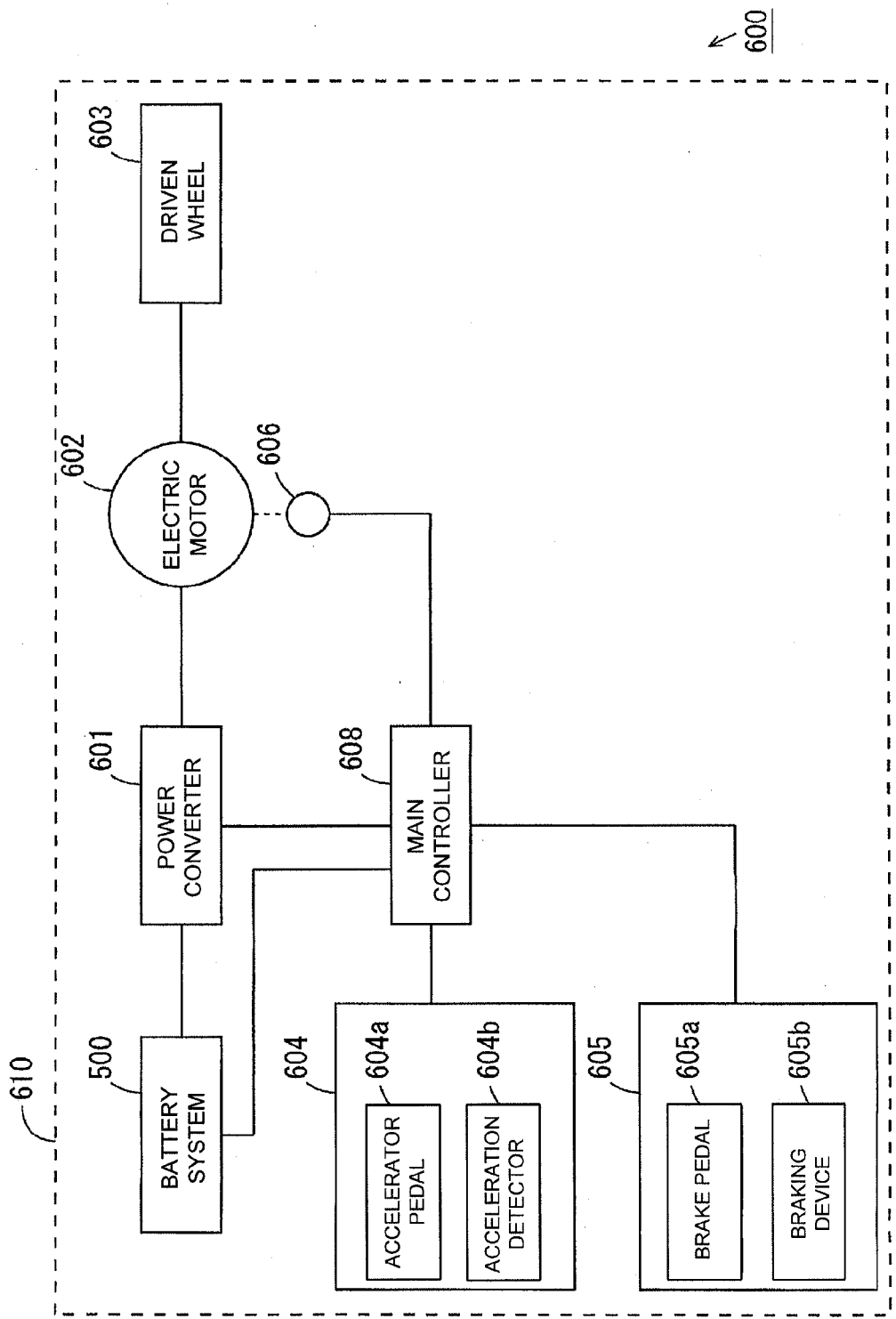
FIG. 20 is a block diagram showing the construction of an electric car according to a sixth embodiment.

FIG. 20 is a block diagram showing the construction of the electric car according to the sixth embodiment. As shown in FIG. 20, the electric car 600 according to this embodiment includes a car body 610. The car body 610 includes the aforementioned battery system 500, a power conversion portion 601, an electric motor 602, driven wheels 603, an accelerator 604, a braking device 605, a rotational speed sensor 606, and a main control portion 608. In the case where the electric motor 602 is an alternating current (AC) electric motor, the power conversion portion 601 includes an inverter circuit.

The battery system 500 is connected to the electric motor 602 through the power conversion portion 601, and to the main control portion 608. The battery ECU 101 (FIG. 19) of the battery system 500 calculates charged amounts of the battery cells 10 based on the terminal voltages of the battery cells 10.

The charged amounts of the of battery cell 10 are provided to the main control portion 608 from the battery ECU 101. In addition, the accelerator device 604, the braking device 605, and the rotational speed sensor 606 are connected to the main control portion 608. The main control portion 608 includes a CPU and a memory, or a microcomputer, for example.

The accelerator device 604 includes an accelerator pedal 604a that is included in the electric car 600, and an acceleration detection portion 604b that detects an operated amount (depressed amount) of the accelerator pedal 604a. When the accelerator pedal 604a is operated by users, the acceleration detection portion 604b detects the operated amount of the accelerator pedal 604a relative to the reference where the accelerator pedal is not operated by users. The detected operated amount of the accelerator pedal 604a is provided to the main control portion 608.

The braking device 605 includes a brake pedal 605a that is included in the electric car 600, and a brake detection portion 605b that detects an operated amount (depressed amount) of the brake pedal 605a operated by users. When the brake pedal 605a is operated by users, the operated amount is detected by the brake detection portion 605b. The detected operated amount of the brake pedal 605a is provided to the main control portion 608. The rotational speed sensor 606 detects a rotational speed of the electric motor 602. The detected rotational speed is provided to the main control portion 608.

As discussed above, the main control portion 608 is provided with the charged amounts of the battery cells, the operated amount of the accelerator pedal 604a, the operated amount of the brake pedal 605a, and the rotational speed of the electric motor 602. The main control portion 608 controls charging and discharging operations of the battery cells 10, and power conversion of the power conversion portion 601 based on these types of data. For example, in driveaway or acceleration of the electric car 600 in accordance with the accelerator operation, the battery system 500 supplies the power conversion portion 601 with electric power of the battery cells 10.

In addition, the main control portion 608 calculates a rotating force (command torque) to be transmitted to the driven wheels 603 in accordance with the provided operated amount of the accelerator pedal 604a, and provides the power conversion portion 601 with a control signal in accordance with the command torque.

When receiving the aforementioned control signal, the power conversion portion 601 converts the electric power supplied from the battery system 500 into electric power (driving electric power) required to drive the driven wheels 603. Thus, the driving electric power converted by the power conversion portion 601 is supplied to the electric motor 602, and a rotating force of the electric motor 602 is transmitted to the driven wheels 603 in accordance with the driving electric power.

On the other hand, in deceleration of the electric car 600 in accordance with the acceleration operation, the electric motor 602 serves as an electric generator. In this case, the power conversion portion 601 converts regenerative power that is produced by the electric motor 602 into electric power suitable for charging the battery cells 10, and provides the converted electric power to the battery cells 10. Thus, the battery cells 10 are charged.

(6-2) Effects

The battery system 500 according to the foregoing fifth embodiment is used for the electric car 600 according to this embodiment. Accordingly, the construction of the battery module 100 can be simplified, and the battery module 100 can be easily assembled. As a result, it is possible to reduce the manufacturing cost of the electric car 600.

(6-3)

As discussed above, the electric vehicle according to this embodiment includes the aforementioned battery system, the driving electric motor, which is energized by electric power of the battery system, and the driven wheels, which are driven by the rotating force of the electric motor.

In the electric vehicle, the electric motor is energized by the electric power from the aforementioned battery system. The driven wheels are rotated by the rotating force of the electric motor so that the electric vehicle runs. According to this embodiment, since the aforementioned battery system is used, the construction of the battery module can be simplified, and the battery module can be easily assembled. As a result, it is possible to reduce the manufacturing cost of the electric vehicle.

(6-4) Other Mobile Units

The battery system 500 according to the fifth embodiment can be installed on other mobile units such as ship, aircraft, elevator, or walking robot.

For example, the ship, which includes the battery system 500, includes a hull, a screw, an acceleration input portion, and a deceleration input portion instead of the car body 610, the driven wheels 603, the accelerator device 604, and the braking device 605 shown in FIG. 20, respectively. Crews operate the acceleration input portion instead of the accelerator device 604 when accelerating the ship, and operate the deceleration input portion instead of the braking device 605 when decelerating the ship. In this case, the hull, the electric motor, and the screw correspond to a mobile body, a power source, and a driving portion, respectively. In this case, the electric motor is energized by electric power from the battery system 500, and converts the electric power into power for driving the ship so that the hull moves by rotating the screw by using the converted power.

Similarly, the aircraft, which includes the battery system 500, includes an airframe, a propeller, an acceleration input portion, and a deceleration input portion instead of the car body 610, the driven wheels 603, the accelerator device 604, and the braking device 605 shown in FIG. 20, respectively. In this case, the airframe, the electric motor, and the propeller correspond to a mobile body, a power source, and a driving portion, respectively. In this case, the electric motor is energized by electric power from the battery system 500, and converts the electric power into power for driving the aircraft so that the airframe moves by rotating the propeller by using the converted power.

For example, the elevator, which includes the battery system 500, includes an enclosed platform, an ascent/descent rope attached to the platform, an acceleration input portion, and a deceleration input portion instead of the car body 610, the driven wheels 603, the accelerator device 604, and the braking device 605 shown in FIG. 20, respectively. In this case, the platform, the electric motor, and the ascent/descent rope correspond to a mobile body, a power source, and a driving portion, respectively. In this case, the electric motor is energized by electric power from the battery system 500, and converts the electric power into power for driving the elevator so that the platform is moved by winding the ascent/descent rope by using the converted power.

For example, the walking robot, which includes the battery system 500, includes a body, legs, an acceleration input portion, and a deceleration input portion instead of the car body 610, the driven wheels 603, the accelerator device 604, and the braking device 605 shown in FIG. 20, respectively. In this case, the body, the electric motor, and the legs correspond to a mobile body, a power source, and a driving portion, respectively. In this case, the electric motor is energized by electric power from the battery system 500, and converts the electric power into power for driving the robot so that the body moves by moving the legs by using the converted power.

In the mobile unit that includes the battery system 500, the power source is energized by electric power from the battery system 500, and converts the electric power into power for driving the mobile unit so that the mobile body moves by using the power converted by the power source.

(6-5) Effects of Other Mobile Units

Also in these types of mobile units, since the battery system 500 according to the foregoing fifth embodiment is used, the construction of the battery module 100 can be simplified, and the battery module 100 can be easily assembled. As a result, it is possible to reduce the manufacturing cost of the mobile units.

(6-6)

The mobile unit according to this embodiment includes the aforementioned battery system, the mobile body, the power source that converts electric power from the battery system into power for moving the mobile body, and the driving portion that allows the mobile body to move by using the driving power, which is converted by the power source.

In the mobile unit, the electric power from the aforementioned battery system is converted into power by the power source, and the driving portion moves the mobile body by using the power. According to this embodiment, since the aforementioned battery system is used, the construction of the battery module can be simplified, and the battery module can be easily assembled. As a result, it is possible to reduce the manufacturing cost of the mobile unit.

(7) Seventh Embodiment

A power supply device according to a seventh embodiment of the present invention is now described. The power supply device according to this embodiment includes the battery systems 500 according to the fifth embodiment.

(7-1) Construction and Operation

Figure 21:
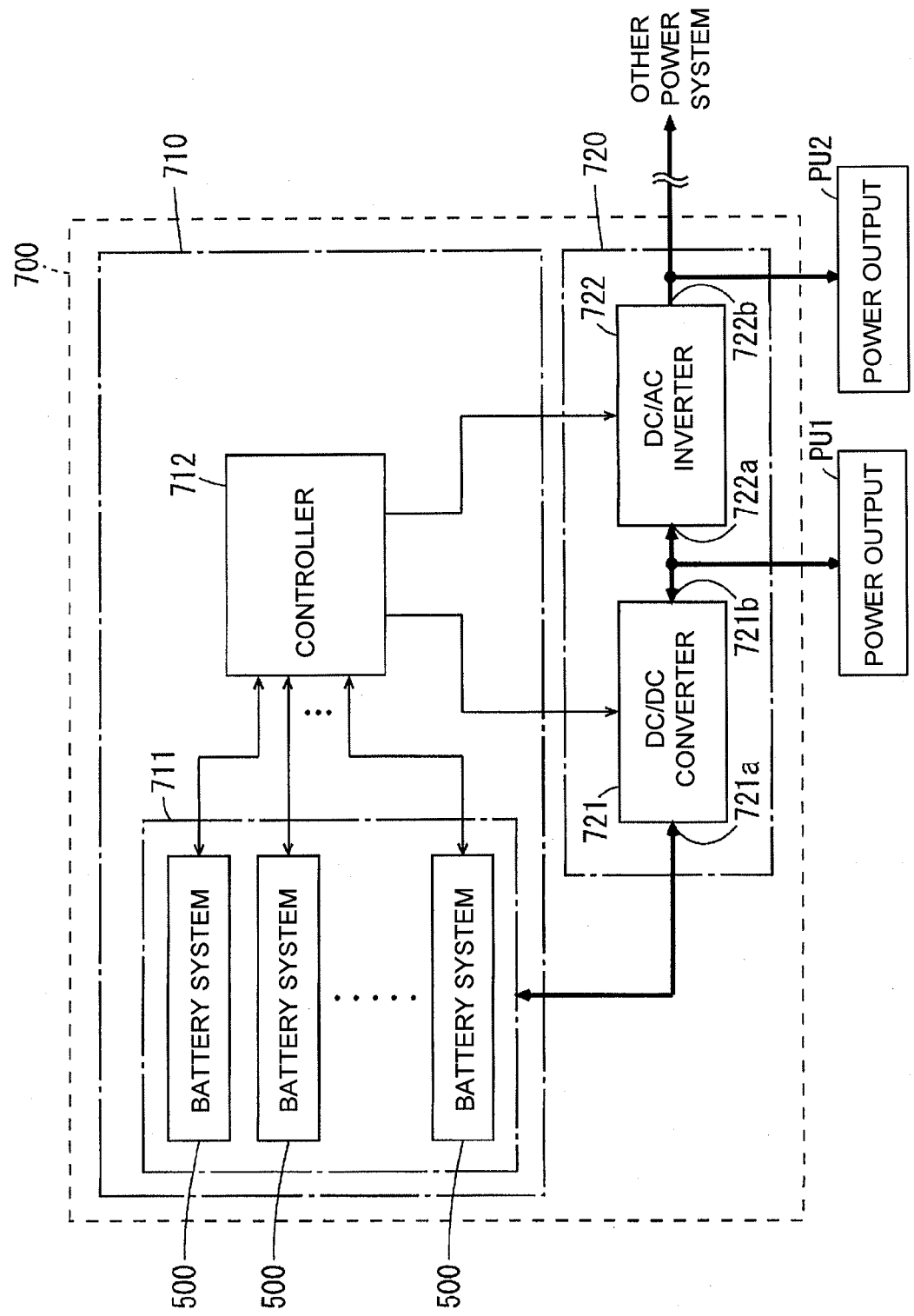
FIG. 21 is a block diagram showing the construction of a power supply device according to a seventh embodiment.

FIG. 21 is a block diagram showing the construction of the power supply device according to the seventh embodiment. As shown in FIG. 21, the power supply device 700 includes an electric power storage device 710, and an electric power conversion device 720. The electric power storage device 710 includes a battery system group 711, and a controller 712. The battery system group 711 includes the battery systems 500 according to the fifth embodiment. The battery cells 100 of the battery systems 500 can be connected in parallel or in series to each other.

The controller 712 is an example of control portion, and includes a CPU and a memory, or a microcomputer, for example. The controller 712 is connected to the battery ECUs 101 (FIG. 19) in the battery systems 500. The battery ECU 101 of the battery system 500 calculates charged amounts of the battery cells 10 based on the terminal voltages of the battery cells 10, and provides the calculated charged amounts to the controller 712. The controller 712 controls the electric power conversion device 720 based on the charged amounts of the battery cells 10 that are provided from the battery ECUs 101, and controls discharging and charging operations of the battery cells 10 included in the battery systems 500.

The electric power conversion device 720 includes a DC/DC (direct current/direct current) converter 721, and a DC/AC (direct current/alternating current) inverter 722. The DC/DC converter 721 includes input/output terminals 721a and 721b. The DC/AC inverter 722 includes input/output terminals 722a and 722b. The input/output terminals 721a of the DC/DC converter 721 are connected to the battery system group 711 of the electric power storage device 710. The input/output terminal 721b of the DC/DC converter 721 and the input/output terminal 722a of the DC/AC inverter 722 are connected to each other, and are connected to a power output portion PU1. The input/output terminal 722b of DC/AC inverter 722 is connected to a power output portion PU2, and to other electric power system. The power output portions PU1 and PU2 include outlets. Various loads can be connected to the power output portions PU1 and PU2, for example. Other electric power system can include commercial power or a solar battery, for example. The power output portions PU1 and PU2, and other electric power system are examples of external device to which the power supply device is connected.

The controller 712 controls the DC/DC converter 721 and the DC/AC inverter 722 so that the battery cells 10 included in the battery system group 711 can be discharged and charged.

When the battery system group 711 is discharged, the DC/DC converter 721 converts electric power that is provided from the battery system group 711 from DC (direct current) into DC (direct current), and the DC/AC inverter 722 additionally converts the converted electric power from DC (direct current) into AC (alternating current).

Electric power that is converted from DC into DC by the DC/DC converter 721 is provided to the power output portion PU1. Electric power that is converted from DC into AC by the DC/AC inverter 722 is provided to the power output portion PU2. The direct current electric power is supplied from the power output portion PU1 to the external device, and the alternating current electric power is supplied from the power output portion PU2 to the external device.

Electric power that is converted into alternating current by the DC/AC inverter 722 can be supplied to other electric power system.

The controller 712 controls discharging operation of the battery cells 10 included in the battery systems 500 as discussed below, for example. When the battery system group 711 is discharged, the controller 712 determines whether to stop discharging operation based on the charged amounts of the battery cells 10 that are provided from the battery ECUs 101 (FIG. 19), and controls the electric power conversion device 720 based on the determination result. Specifically, if the charged amount of any of the battery cells 10 (FIG. 19) included in the battery system group 711 becomes lower than a predetermined threshold, the controller 712 controls the DC/DC converter 721 and the DC/AC inverter 722 so that discharging operation is stopped or discharging current (or discharging electric power) is restricted. According to this construction, it is possible to prevent that the battery cells 10 are overdischarged.

Also, when the battery system group 711 is charged, the DC/AC inverter 722 converts alternating current electric power that is provided from other electric power system from AC (alternating current) into DC (direct current), and the DC/DC converter 721 additionally converts the converted electric power from DC (direct current) into DC (direct current). When the electric power is supplied to the battery system group 711 through the DC/DC converter 721, the battery cells 10 (FIG. 19) included in the battery system group 711 can be charged.

The controller 712 controls charging operation of the battery cells 10 included in the battery systems 500 as discussed below, for example. When the battery system group 711 is charged, the controller 712 determines whether to stop charging operation based on the charged amounts of the battery cells 10 that are provided from the battery ECUs 101 (FIG. 19), and controls the electric power conversion device 720 based on the determination result. Specifically, if the charged amount of any of the battery cells 10 included in the battery system group 711 becomes higher than a predetermined threshold, the controller 712 controls the DC/DC converter 721 and the DC/AC inverter 722 so that charging operation is stopped or charging current (or charging electric power) is restricted. According to this construction, it is possible to prevent that the battery cells 10 are overcharged.

(7-2) Effects

The battery system 500 according to the foregoing fifth embodiment is used for the power supply device 700 according to this embodiment. Accordingly, the construction of the battery module 100 can be simplified, and the battery module 100 can be easily assembled. As a result, it is possible to reduce the manufacturing cost of the mobile units.

(7-3)

An electric power storage device according to this embodiment includes the aforementioned battery system, and a control portion that controls discharging and charging operations of the battery modules of the battery system.

In the electric power storage device, the control portion controls discharging and charging operations of the battery cells. According to this construction, it is possible to prevent deterioration, overcharge, and overdischarge of the battery cell. Also, since the aforementioned battery system is used, the construction of the battery module can be simplified, and the battery module can be easily assembled. As a result, it is possible to reduce the manufacturing cost of the electric power storage device.

A power supply device according to this embodiment can be connected to an external device. The power supply device includes the aforementioned electric power storage device, and an electric power conversion device that is controlled by the control portion of the electric power storage device, and converts electric power between the battery system of the electric power storage device and the external device.

In the power supply device, the electric power conversion device converts electric power between the battery cells and the external device. The control portion of the electric power storage device controls the electric power conversion device whereby controlling discharging and charging operations of the battery cells. According to this construction, it is possible to prevent deterioration, overcharge, and overdischarge of the battery cell. Also, since the aforementioned battery system is used, the construction of the battery module can be simplified, and the battery module can be easily assembled. As a result, it is possible to reduce the manufacturing cost of the power supply device.

(7-3) Modified Embodiment of Power Supply Device

Although each of the battery systems 500 includes the battery ECU 101 in the power supply device 700 shown in FIG. 21, the controller 712 may have similar functions to the battery ECU 101 instead of the battery ECU.

The electric power conversion device 720 may include only one of the DC/DC converter 721 and the DC/AC inverter 722 as long as electric power can be supplied between the power supply device 700 and the external device. Also, the electric power conversion device 720 may be omitted as long as electric power can be supplied between the power supply device 700 and the external device.

Although a plurality of battery systems 500 are included in the power supply device 700 shown in FIG. 21, the present invention is not limited to this. The power supply device may include only one battery system 500.

(8) Other Embodiments

Although the battery module 100 according to the foregoing embodiment consists of six battery cells 10, the number of the battery cells 10 is not limited to this. The number of the battery cells can be any natural number.

Although the FPC board 50 and the circuit board 70 overlap each other in the Z direction in the foregoing first to third embodiments, the FPC board 50 and the circuit board 70 may not overlap each other in the Z direction. For example, the FPC board 50 and the circuit board 70 may be arranged adjacent to each other on the front or back surface of the cover member 60 without overlapping each other. In this case, strip-shaped connection members can be used as the first connection members instead of the connection members PH, for example. One end part of the strip-shaped connection member is connected to the terminal portion of the FPC board 50, while another end is connected to the terminal portion of the circuit board 70. Thus, the FPC board 50 and the circuit board 70 are electrically connected to each other. Also, the connection member may be formed integrally with the FPC board 50.

Although all of the battery cells 10 are connected in series to each other in the battery module 100 according to the foregoing embodiment, the present invention is not limited to this. All or some of the battery cells 10 may be connected in parallel to each other. Although all of the battery modules 100 are connected in series to each other in the battery system 500 according to the foregoing embodiment, the present invention is not limited to this. All or some of the modules 100 may be connected in parallel to each other.

Although the battery cells 10 having a low-profile substantially rectangular parallelepiped shape are used in the foregoing embodiment, the present invention is not limited to this. The battery cells 10 having a cylindrical shape, or laminated-type battery cells 10 may be used.

The mobile units such as the electric car 600 and ship according to the sixth foregoing embodiment are electric devices that include the battery system 500, and the electric motor 602 as load. The electric device according to the present invention is not be limited to mobile units such as the electric car 600 and ship, but may be a washing machine, refrigerator, air conditioner, or the like. For example, the washing machine is an electric device that includes an electric motor as load. Also, the refrigerator or air conditioner is an electric device that includes a compressor as load. In addition, an electric device according to the present invention can be a television, communication device, luminaire, or the like, that includes the battery system 500 as emergency power supply.

As discussed above, the electric device according to this embodiment includes the aforementioned battery system, and a load that is energized by electric power from the battery system. In the electric device, the load is energized by the electric power from the battery system.

Since the aforementioned battery system is used in the electric device, the construction of the battery module can be simplified, and the battery module can be easily assembled. As a result, the electric device can be easily assembled. Therefore, it is possible to reduce the manufacturing cost of the electric device.

(9) Correspondence Between Elements in Claims and Components in Embodiments

Exemplary correspondence between elements in claims and components in embodiments is now described. However, the present invention is not limited to the following examples.

In the foregoing embodiments, the battery module 100 is an example of battery module. The battery cell 10 is an example of the battery cell. The battery block 10BB is an example of battery block. The cover member 60 is an example of cover member. The voltage detection circuit 71 is an example of voltage detection circuit. The circuit board 70 is an example of circuit board. The FPC board 50 or harness HN is an example of wiring member. The connection member PH and the connectors CN1 and CN2, or the connector CN3 are examples of first connection member. The back surface is an example of first surface. The front surface is an example of second surface. The bus bars 40 and 40a are examples of second connection member.

Also, the battery system 500 is an example of battery system. The electric car 600 is examples of electric vehicle and mobile unit. The electric motor 602 is examples of electric motor and power source. The driven wheel 603 is examples of driven wheel and driving portion. The car body 610 is an example of mobile body. The electric power storage device 710 is an example of electric power storage device. The controller 712 is an example of control portion. The power supply device 700 is an example of power supply device. The electric power conversion device 720 is an example of electric power conversion device. Also, the electric motor 602 and compressor are examples of load. The electric car 600, ship, aircraft, elevator, walking robot, washing machine, refrigerator, air conditioner, television receiver, communication device, and illumination device are examples of electric device.

Other various elements that have the construction or the function recited in claims can be used as elements in the claims.

The invention claimed is:

1. A battery module comprising:
   a battery block that includes a plurality of battery cells, and has a terminal surface on which terminals of said plurality of battery cells are arranged;
   a cover member that is arranged on or above said terminal surface of said battery block;
   a wiring member that overlaps said cover member, and is electrically connected to the terminals of said plurality of battery cells;
   a circuit board that overlaps said wiring member, said circuit board including a voltage detection circuit for detecting terminal voltages of said plurality of battery cells; and
   a first connection member that electrically connects said circuit board to said wiring member;
   wherein said circuit board, said wiring member and said cover member are arranged on or above said terminal surface of said battery block in this order, and
   wherein said circuit board and said wiring member are provided separately from each other.

2. The battery module according to claim 1, wherein said cover member has a first surface that faces said terminal surface of said battery block, and a second surface that is located a side opposite to the first surface,
   wherein said circuit board overlaps said first surface of said cover member, and
   wherein said wiring member is arranged between said cover member and said circuit board, and overlaps said first surface of said cover member.

3. The battery module according to claim 1, wherein said cover member, said circuit board, said wiring member, and said first connection member are integrally formed with each other by resin.

4. The battery module according to claim 1 further comprising second connection members for electrical connection of the terminals of said plurality of battery cells, wherein said wiring member is connected to said second connection members.

5. The battery module according to claim 4, wherein said second connection members are fastened to said cover member.

6. A battery system comprising:
   one or a plurality of battery modules; and
   said one or at least one of said plurality of battery modules is the battery module according to claim 1.

7. The battery module according to claim 1,
   wherein said cover member has a first surface that faces said terminal surface of said battery block, and a second surface that is located on a side opposite to the first surface,
   wherein said circuit board is positioned between said battery block and said cover member to overlap said first surface of said cover member.

8. The battery module according to claim 7, wherein said first connection member overlaps said second surface of said cover member.

9. A battery module comprising:
   a battery block that includes a plurality of battery cells, and has a terminal surface on which terminals of said plurality of battery cells are arranged;
   a circuit board that overlaps said terminal surface of said battery block, and includes a voltage detection circuit for detecting terminal voltages of said plurality of battery cells;
   a cover member that is arranged on or above said terminal surface of said battery block and overlaps said circuit board;
   a wiring member that overlaps said cover member, and is electrically connected to the terminals of said plurality of battery cells; and
   a first connection member that electrically connects said circuit board to said wiring member,
   wherein said wiring member, said cover member and said circuit board are arranged on or above said terminal surface of said battery block in this order.

* * * * *